(12) United States Patent
Seo

(10) Patent No.: US 12,294,274 B2
(45) Date of Patent: May 6, 2025

(54) MOTOR

(71) Applicant: HYUNDAI MOBIS Co., Ltd., Seoul (KR)

(72) Inventor: Yeong Woo Seo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 389 days.

(21) Appl. No.: 17/940,583

(22) Filed: Sep. 8, 2022

(65) Prior Publication Data

US 2023/0082378 A1 Mar. 16, 2023

(30) Foreign Application Priority Data

Sep. 10, 2021 (KR) .......................... 10-2021-0121237
Sep. 10, 2021 (KR) .......................... 10-2021-0121238
Dec. 14, 2021 (KR) .......................... 10-2021-0178909

(51) Int. Cl.
   *H02K 5/20* (2006.01)
   *H02K 9/19* (2006.01)

(52) U.S. Cl.
   CPC .............. *H02K 5/20* (2013.01); *H02K 5/203* (2021.01); *H02K 9/19* (2013.01)

(58) Field of Classification Search
   CPC ............. H02K 5/20; H02K 5/203; H02K 9/19
   See application file for complete search history.

(56) References Cited

U.S. PATENT DOCUMENTS

| 2016/0352201 | A1* | 12/2016 | Ranjan | ...................... H02K 9/06 |
| 2018/0351431 | A1* | 12/2018 | Kim | .......................... H02K 5/15 |
| 2022/0069664 | A1* | 3/2022 | Kim | .......................... H02K 9/19 |

FOREIGN PATENT DOCUMENTS

| JP | 2009-261214 A | 11/2009 |
| KR | 10-2018-0068736 A | 6/2018 |
| KR | 10-2018-0068738 A | 6/2018 |

OTHER PUBLICATIONS

Office Action issued in corresponding Korean Priority Application No. 10-2021-0121238 dated Jan. 2, 2025, with English translation.

* cited by examiner

*Primary Examiner* — Jue Zhang
(74) *Attorney, Agent, or Firm* — MORGAN, LEWIS & BOCKIUS LLP

(57) ABSTRACT

Disclosed is a motor. The motor includes a housing part including a housing body, and a housing cover that covers one side of the housing body, a stator provided in an interior of the housing body, a rotor assembly accommodated inside the stator to be rotatable, and having a fluid flow path for causing a cooling fluid introduced to a front side thereof to flow into a rear side that faces the housing cover, and a reflective plate coupled to the rotor assembly, disposed between the rotor assembly and the housing cover, and that defines a fluid spattering path, along which the cooling fluid that flows through the fluid flow path spatters in a radial direction thereof.

15 Claims, 30 Drawing Sheets

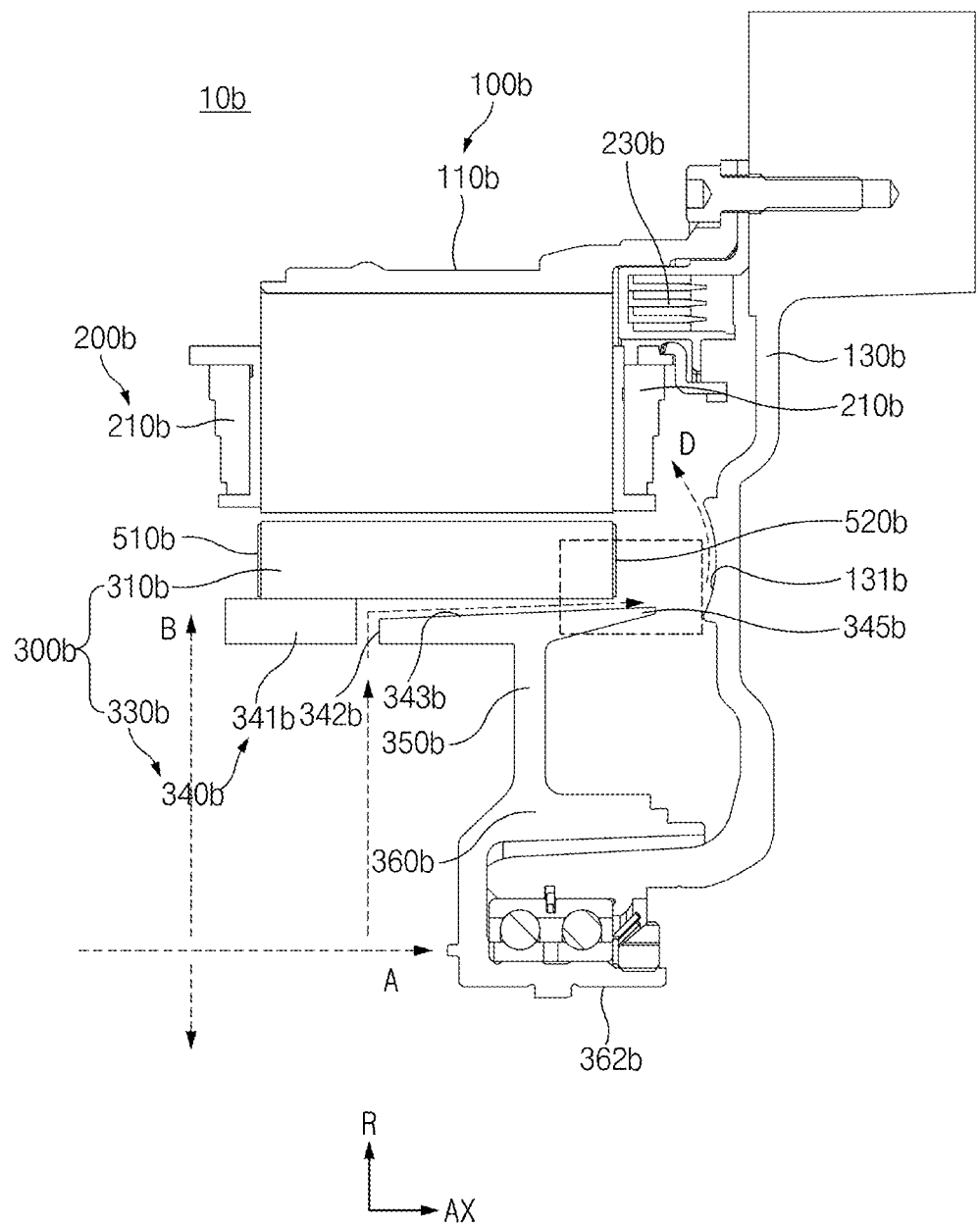
F I G. 30

MOTOR

CROSS-REFERENCE TO RELATED APPLICATION

This application claims the benefit of priorities to Korean Patent Application No. 10-2021-0121237, 10-2021-0121238, and 10-2021-0178909, filed in the Korean Intellectual Property Office on Sep. 10, 2021, Sep. 10, 2021, and Dec. 14, 2021, respectively, the entire contents of which are incorporated herein by reference.

TECHNICAL FIELD

The present disclosure relates to a motor, and more particularly, to a motor having an enhanced cooling efficiency.

BACKGROUND

A driving motor is configured to generate a rotational force when electric power is supplied thereto, and has various structures. For example, a driving motor used for an electric vehicle may include a housing, a stator installed in an interior of the housing, and a rotor integrally coupled to a rotary shaft in an interior of the stator. When a current is applied to a stator coil installed in the stator, an induced current is generated in the rotor and a rotational force is generated as the rotor is rotated.

A heat emitting source of the driving motor is the stator coil, in which a current flows, and a rotor core, in which a magnetic flux flows. When the driving motor is operated, the temperatures of the corresponding components increases and their functions may become abnormal if the increase of the temperature is excessive. Accordingly, it is important to efficiently cool the heat generated by the motor. In particular, when the stator is overheated, a functional abnormality occurs.

In general, a driving motor cooling structure is a structure that cools a motor by forming a cooling passage, in which a cooling fluid spatters to an outside of the rotor when the rotor is rotated. The stator including the coil may be cooled by the cooling fluid that spatters to the outside of the rotor.

However, according to the conventional structure, it is difficult for the cooling fluid to reach an interior space of the motor, that is, a space covered by the housing cover, and an overall cooling efficiency of the motor deteriorates unless a separate device and a separate structure, such as a pump, is not applied. In particular, the coil and the terminal are located in the interior space of the motor, and the coil and the terminal are welded to each other, and thus an insulation destruction, such as a short-circuit, may occur due to overheating. Accordingly, a functional abnormality of the motor occurs. Accordingly, a cooling structure that may effectively cool the terminal and the coil in the interior of the motor without using a separate device is necessary.

SUMMARY

The present disclosure has been made to solve the above-mentioned problems occurring in the prior art while advantages achieved by the prior art are maintained intact.

An aspect of the present disclosure provides a motor that may effectively cool components located in a motor interior-space because a cooling fluid may reach an area, which is difficult for the cooling fluid to reach, that is, the motor interior-space in an existing structure.

Another aspect of the present disclosure provides a motor may prevent a terminal and a coil located in a motor interior-space from being insulation-destructed due to overheating because a cooling fluid may delivered to the terminal and the coil without using an additional separate device.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a motor includes a housing part including a housing body, and a housing cover that covers one side of the housing body, a stator disposed in an interior of the housing body, a rotor assembly accommodated inside the stator to be rotatable, and having a fluid flow path for causing a cooling fluid introduced to a front side thereof to flow a rear side that faces the housing cover, and a reflective plate coupled to the rotor assembly, disposed between the rotor assembly and the housing cover, and that defines a fluid spattering path, along which the cooling fluid that flows through the fluid flow path spatters in a radial direction of the rotor assembly.

The rotor assembly may further include a rotor core having a through-hole disposed in an interior of the rotor core in an axial direction of the rotor assembly, and a rotor sleeve coupled to the rotor core to pass through the through-hole, and having a shaft hole that passes therethrough in the axial direction and a front space part that is opened in a direction opposite to a direction that faces the housing cover.

When a space between rear surfaces of the stator and the rotor assembly, and the housing cover is regarded as a motor interior-space, the fluid flow path may be implemented by the rotor sleeve and the rotor core, and is that communicates the front space part and the motor interior-space.

The reflective plate may be coupled to the rotor sleeve, extend in the radial direction, and has a ring shape.

The rotor sleeve may further include a boss part having the shaft hole, and coupled to the housing cover to be rotatable, a radius part extending from the boss part in the radial direction, and a sleeve body part extending from an end of the radius part, having a cylindrical shape, and the rotor core is assembled on an outer peripheral surface of the sleeve body part.

The sleeve body part may include a body, a communication hole passing through the body to be communicated with the front space part, and a flow groove disposed concavely on an outer surface of the body to be communicated with the communication hole, and extends from the communication hole in the direction that faces the housing cover, and the fluid flow path may be implemented by the communication hole and the flow groove.

The sleeve body part may include a plurality of flow grooves and a plurality of communication holes, and the plurality of flow grooves and the plurality of communication holes may be spaced apart from each other along a circumferential direction of the sleeve body part.

An end of at least one of the flow grooves, in the direction that faces the housing cover, may be arranged to be inclined toward an outer side in the radial direction as the at least one of the plurality of flow grooves extends in the direction that faces the housing cover.

An end of at least one of the plurality of flow grooves, in the direction that faces the housing cover, may extend straight in the direction that faces the housing cover.

A spattering hole may pass through the radius part, and the fluid flow path may be implemented by the spattering hole.

The spattering hole may be disposed to be inclined to face an outer side in the radial direction as the spattering hole extends in the direction that faces the housing cover.

The reflective plate may include a coupling part coupled to the body part, an extension part extending from the coupling part, and a reflection part extending from an end of the extension part in the radial direction, and that faces the fluid flow path.

The boss part may further include a coupling recess disposed concavely such that an end of the coupling part is inserted thereinto and coupled thereto.

The reflection part may be curved in the direction that faces the housing cover.

The reflection part may be disposed to be closer to the housing cover than to the coupling part with respect to the axial direction, and the extension part may be disposed to be inclined to face an outer side in the radial direction as the extension part extends from the coupling part in a direction that faces the reflection part.

BRIEF DESCRIPTION OF THE DRAWINGS

The above and other objects, features and advantages of the present disclosure will be more apparent from the following detailed description taken in conjunction with the accompanying drawings:

FIG. 30 is a cross-sectional view illustrating a portion of a motor according to a modified example of a first modification of a third embodiment of the present disclosure.

DETAILED DESCRIPTION

Hereinafter, embodiments of the present disclosure will be described in detail with reference to the accompanying drawings.

First, the embodiments described herein are embodiments that are suitable for understanding the technical features of a motor according to the present disclosure. However, the present disclosure is not limited to the embodiment described below or the technical features of the present disclosure are not limited by the described embodiments, and the present disclosure may be variously modified without departing from the technical scope of the present disclosure.

First Embodiment

Figure 1:
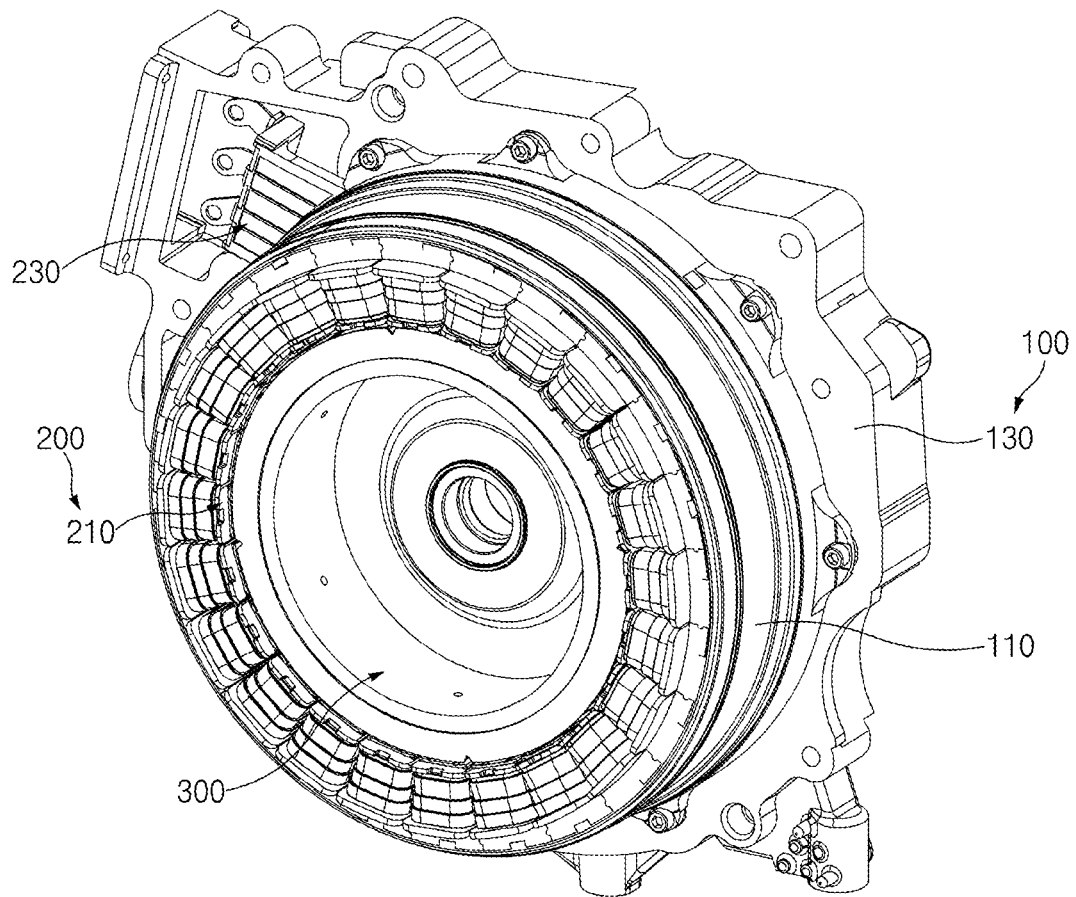
FIG. 1 is a perspective view illustrating a motor according to a first embodiment of the present disclosure.
Figure 2:
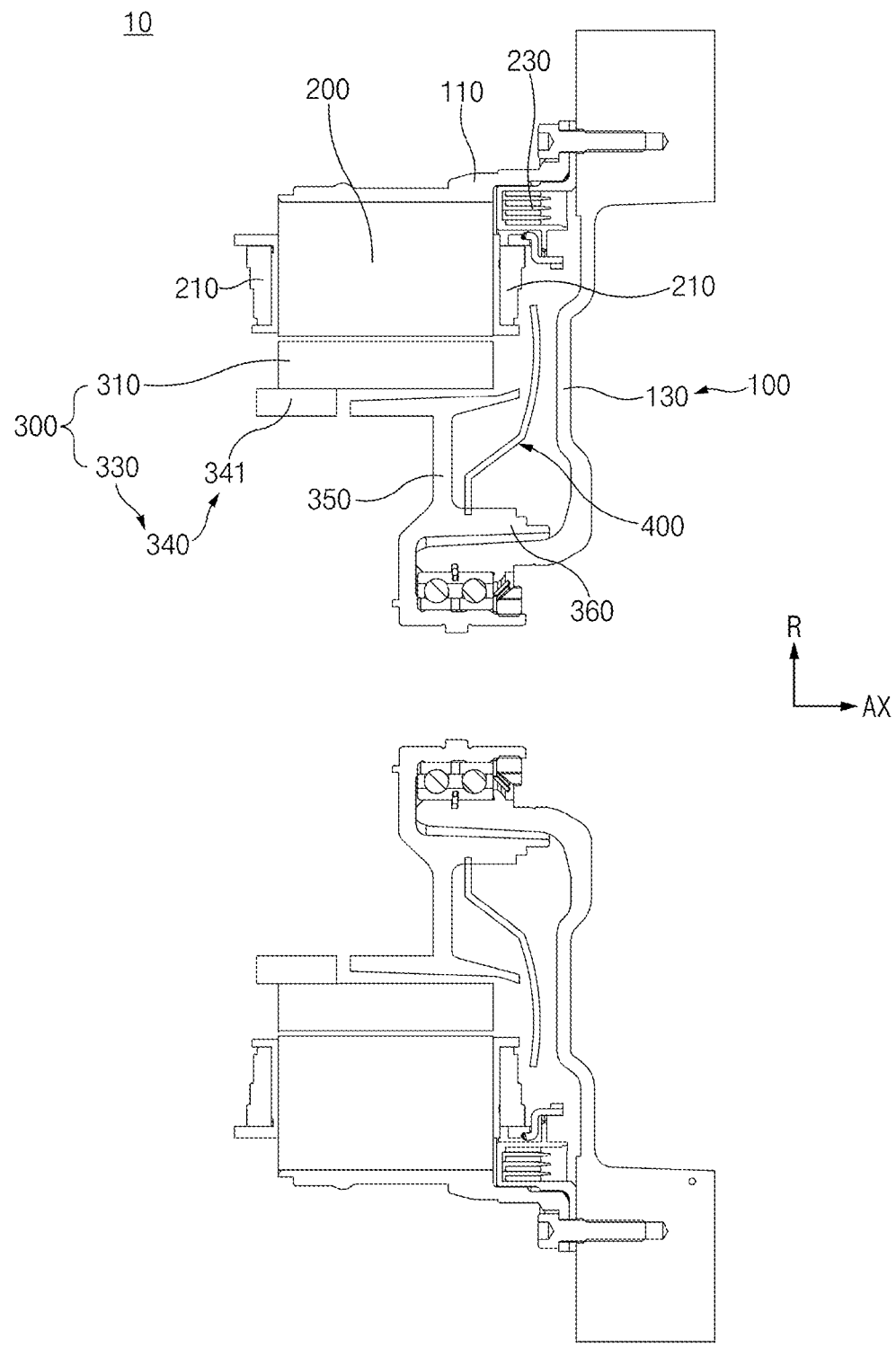
FIG. 2 is a cross-sectional view of a cross-section of a motor according to a first embodiment of the present disclosure.
Figure 3:
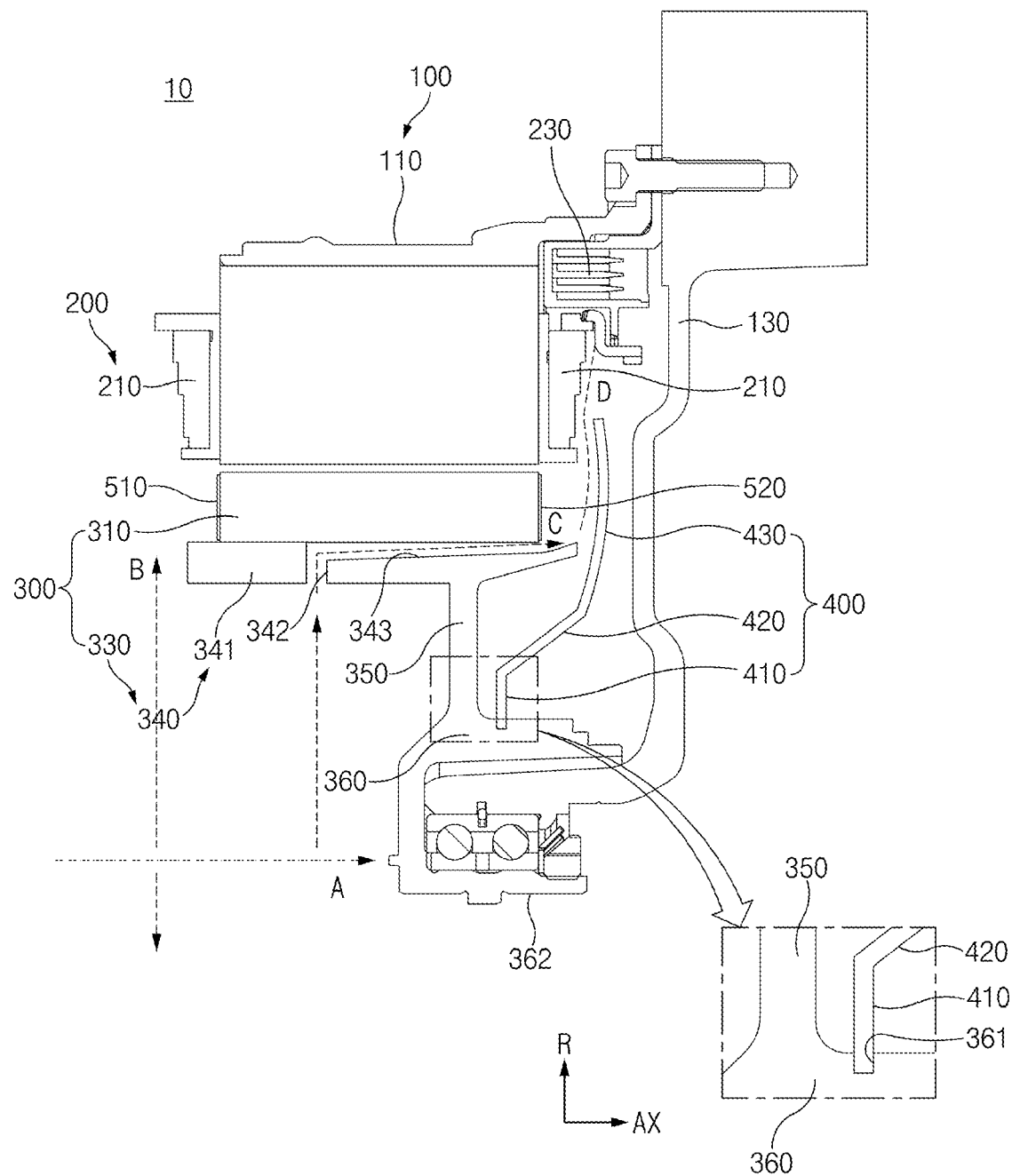
FIG. 3 is a cross-sectional view illustrating a portion of a motor according to a first embodiment of the present disclosure, and is an enlarged cross-sectional view of a portion of FIG. 2.
Figure 4:
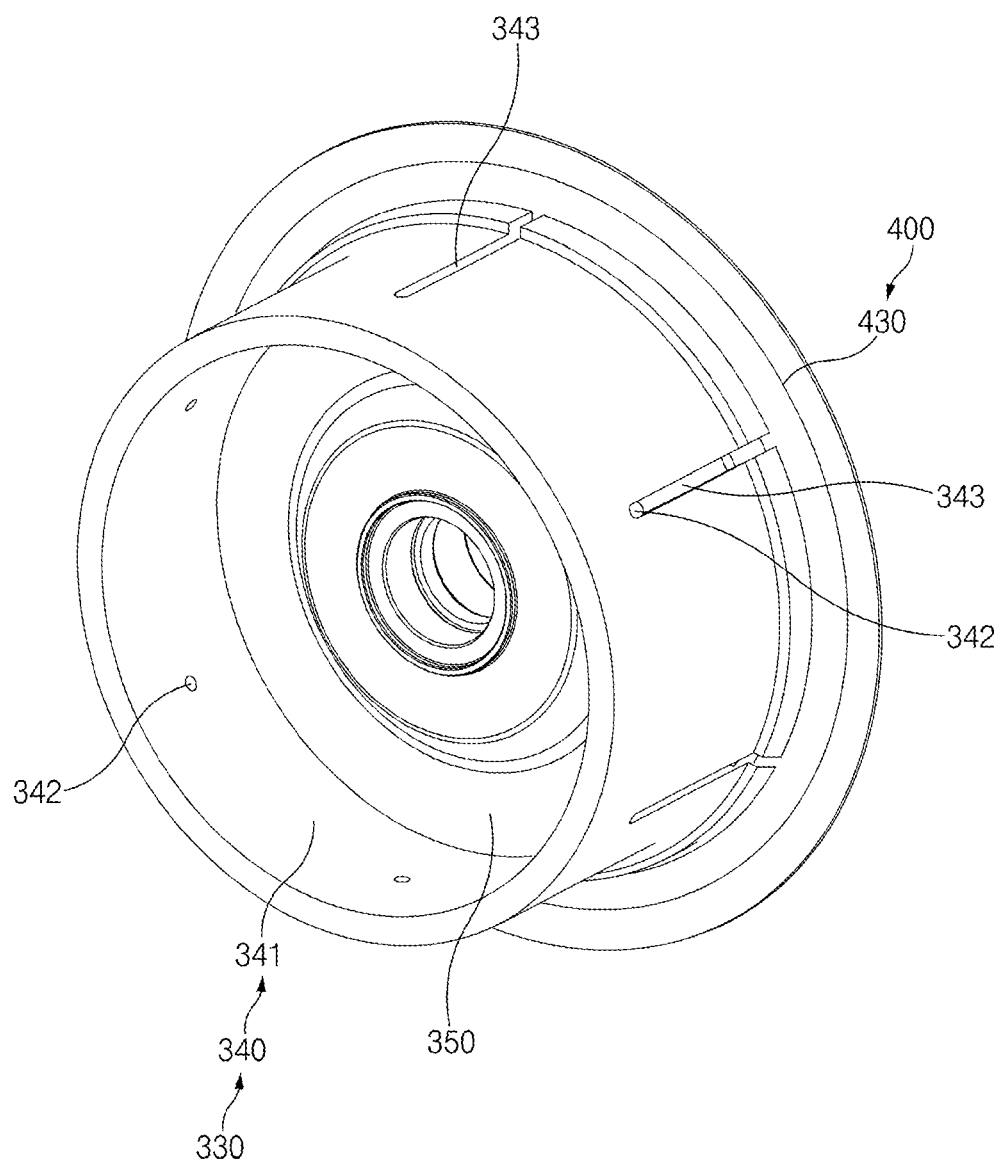
FIG. 4 is a perspective view illustrating a state, in which a rotor sleeve and a reflective plate according to a first embodiment of the present disclosure are coupled each other, when viewed from a front side.
Figure 5:
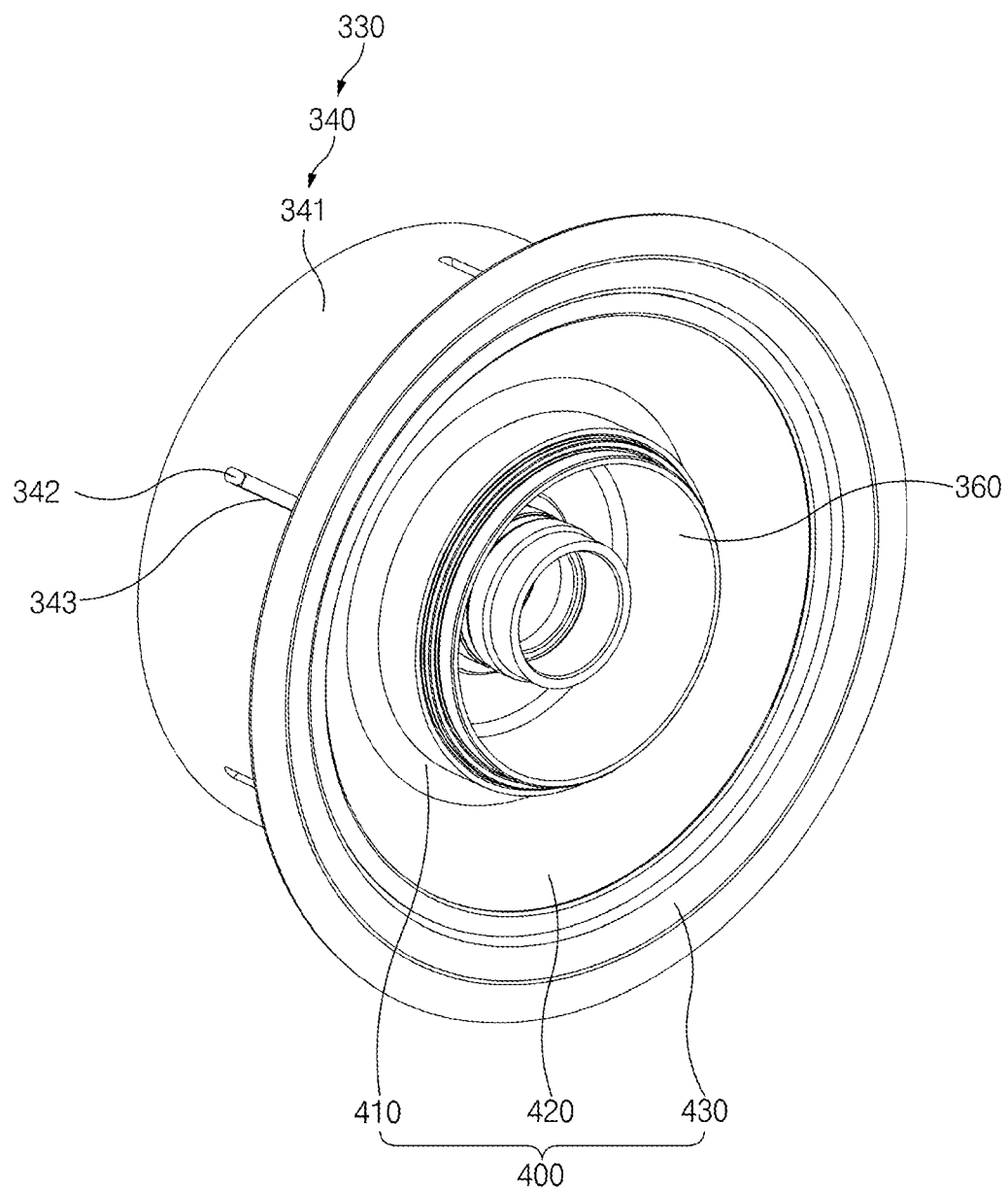
FIG. 5 is a perspective view illustrating a state, in which a rotor sleeve and a reflective plate according to a first embodiment of the present disclosure are coupled each other, when viewed from a rear side.
Figure 6:
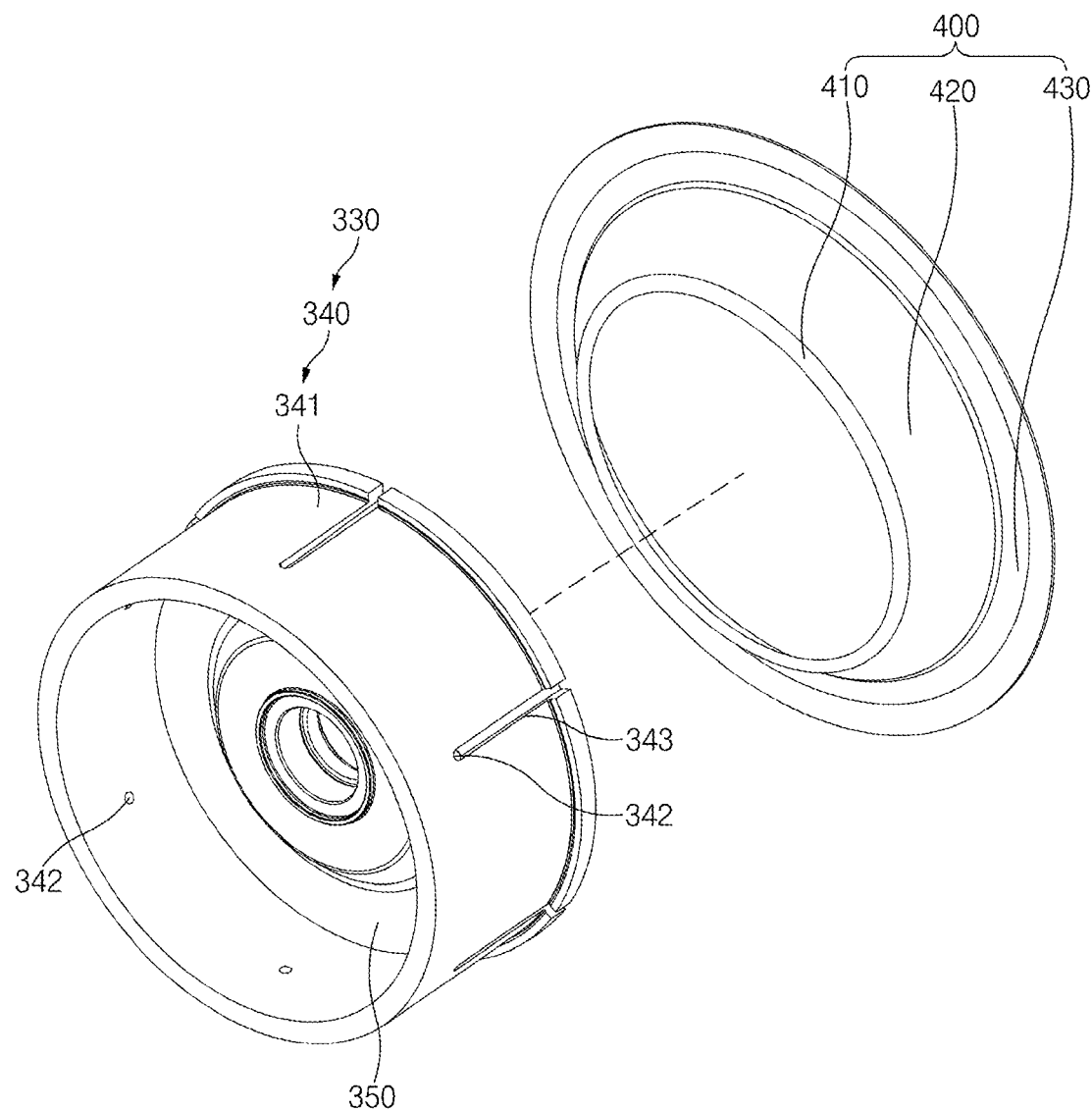
FIG. 6 is an exploded perspective view illustrating a rotor sleeve and a reflective plate illustrated in FIG. 4.
Figure 7:
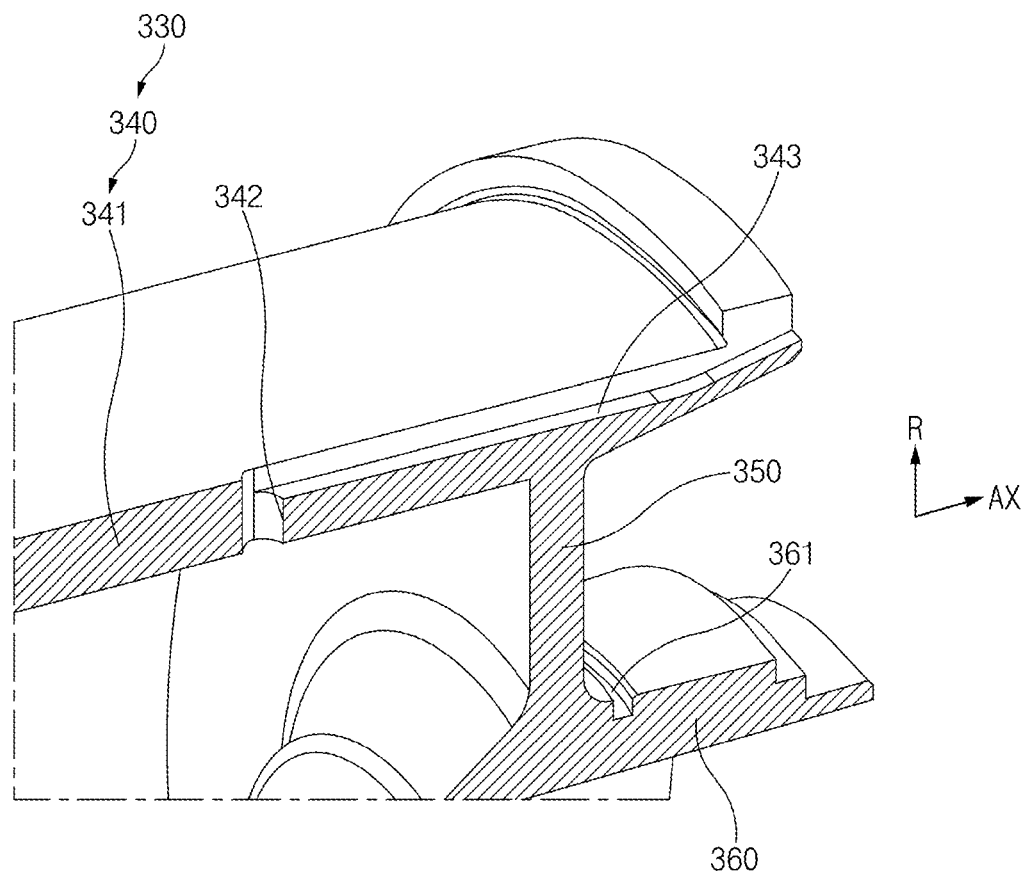
FIG. 7 is a cross-sectional perspective view illustrating a portion of a rotor sleeve according to a first embodiment of the present disclosure.

FIG. 1 is a perspective view illustrating a motor according to a first embodiment of the present disclosure. FIG. 2 is a cross-sectional view of a cross-section of the motor according to the first embodiment of the present disclosure. FIG. 3 is a cross-sectional view illustrating a portion of the motor according to the first embodiment of the present disclosure, and is an enlarged cross-sectional view of a portion of FIG. 2. FIG. 4 is a perspective view illustrating a state, in which a rotor sleeve and a reflective plate according to the first embodiment of the present disclosure are coupled each other, when viewed from a front side. FIG. 5 is a perspective view illustrating a state, in which the rotor sleeve and the reflective plate according to the first embodiment of the present disclosure are coupled each other, when viewed from a rear side. FIG. 6 is an exploded perspective view illustrating the rotor sleeve and the reflective plate illustrated in FIG. 4. FIG. 7 is a cross-sectional perspective view illustrating a portion of the rotor sleeve according to the first embodiment of the present disclosure.

Referring to FIGS. 1 to 7, a motor 10 according to the first embodiment of the present disclosure includes a housing part 100, a stator 200, a rotor assembly 300, and a reflective plate 400.

The housing part 100 includes a housing body 110, and a housing cover 130 that is configured to cover one side of the housing body 110.

The housing body 110 may have a hollow ring shape or a cylindrical shape, and may be coupled and adhered to an outer peripheral surface of the stator 200 to surround it. The housing body 110 may be formed such that opposite ends thereof in an axial direction AX are opened. Here, the axial direction AX of the housing body 110 may coincide with the axial direction AX of the stator 200, the axial direction AX of the rotor assembly 300, and the central axis direction AX of the reflective plate 400. Hereinafter, their general term will be referred to as the axial direction AX.

The housing cover 130 may be coupled to the housing body 110 to cover the one side of the housing body 110 in the axial direction AX. The housing cover 130 has a through-hole such that an output shaft passes therethough.

The stator 200 is provided in an interior of the housing body 110. For example, the stator 200 may be installed while being fixed in the interior of the housing body 110. The stator 200 may include a coil 210 installed in a bobbin, and a terminal 230 that is electrically connected to the coil 210. The coil 210 may be magnetized when an electric voltage is applied to the terminal 230 from an external power source. Hereinafter, an end of the coil 210, which faces the housing cover 130, will be referred to as one-side coil end and an end of the coil 210, in an opposite direction to a direction that faces the housing cover 130, will be referred to as an opposite-side coil end. In this case, the one-side coil end may be covered by the housing cover 130.

The rotor assembly 300 is accommodated inside the stator 200 to be rotatable, and has a fluid flow path for causing a cooling fluid introduced to a front side thereof to flow into a rear side that faces the housing cover 130.

In detail, the bobbin, on which the coil 210 is wound, may be installed to surround the rotor assembly 300, and the rotor assembly 300 may be rotated when electric power is supplied to the coil 210. Through the rotation of the rotor assembly 300, the motor 10 outputs a torque as the output shaft connected to a shaft hole 362 of the rotor assembly 300 is rotated. Hereinafter, a rearward direction of the motor 10 or the rotor assembly 300 is defined as a direction that faces the housing cover 130 from the rotor assembly 300, and a forward direction of the motor 10 or the rotor assembly 300 is defined as an opposite direction to a direction that faces the housing cover 130 from the rotor assembly 300. Furthermore, a space between rear surfaces of the rotor assembly 300 and the stator 200, and the housing cover 130 is defined as a motor interior-space. As in the illustrated embodiment, the one-side coil end and the terminal 230 may be located in the motor interior-space.

The rotor assembly 300 may include a rotor core 310 and a rotor sleeve 330.

A through-hole may be formed in an interior of the rotor core 310 in the axial direction AX. The rotor core 310 may be configured to be rotated because an inductive current is generated when a current is applied to the coil 210 of the stator 200. A first end plate 510 and a second end plate 520 may be provided on opposite ends of the rotor core 310.

The rotor sleeve 330 may pass through the through-hole to be coupled to the rotor core 310, and the shaft hole 362 that extends in the axial direction AX and a front space part that is opened in an opposite direction to the direction that faces the housing cover 130 may be formed in the rotor sleeve 330. In detail, the rotor sleeve 330 is an element that is adhered to an inner peripheral surface of the rotor core 310 and is rotated together with the rotor core 310, and is an element, an output shaft of which is connected to the shaft hole 362 such that a rotational force of the rotor core 310 is transmitted to the output shaft. The front space part may be formed on a front surface of the rotor sleeve 330, and a rear surface of the rotor sleeve 330 may be coupled to the housing cover 130 to be rotatable.

Here, the fluid flow path may be implemented by the rotor sleeve 330, may be implemented by the rotor sleeve 330 and the rotor core 310, and may be configured to be communicated with the front space part and the motor interior-space. That is, the cooling fluid that flows through the front space part may flow in the direction that faces the housing cover 130 through the fluid flow path.

For example, referring to FIGS. 1 to 3, the cooling fluid may be supplied through a cooling channel (not illustrated) provided in the stator 200 or the housing body 110, and may be supplied to the front space part of the rotor sleeve 330 by a pump (not illustrated) (see flow "A" of FIG. 3). The cooling fluid supplied to the front space part of the rotor sleeve 330 may spatter to a radial direction "R" of the rotor assembly 300 when the rotor assembly 300 is rotated to cool the rotor core 310 on an outer side of the rotor sleeve 330 and the coil 210 of the stator 200 (see flow "B" of FIG. 3).

Furthermore, the fluid flow path is formed in the rotor sleeve 330 according to an embodiment of the present disclosure, and thus the cooling fluid supplied to the front space part may flow in the direction that faces the housing cover 130, that is, to the motor interior-space. In detail, the cooling fluid that spatters toward an inner surface of the rotor sleeve 330 in the front space part due to a centrifugal force when the rotor assembly 300 is rotated may be guided by the fluid flow path formed in the rotor sleeve 330 and may flow to the motor interior-space (see flow "C" of FIG. 3).

Furthermore, the reflective plate 400 is coupled to the rotor assembly 300, is disposed between the rotor assembly 300 and the housing cover 130, and is configured to define a fluid spattering path, along which the cooling fluid that flows through the fluid flow path spatters in the radial direction "R".

In detail, the cooling fluid reaches the motor interior-space through the fluid flow path, the reached cooling fluid may be reflected by the reflective plate 400 and may spatter in the radial direction "R" (see flow "D" of FIG. 3). Then, the cooling fluid also may flow in the radial direction "R" by the centrifugal force due to the rotation of the rotor assembly 300, but the reflective plate 400 may function to define the fluid spattering path such that the spattering cooling fluid spatters toward the terminal 230 or the one-side coil end. That is, the fluid spattering path may be a path for guiding the cooling fluid that flows into the interior of the motor toward a periphery of the stator 200, that is, in a direction that faces the coil 210 and the terminal 230.

In this way, the present disclosure may effectively cool components located in the motor interior-space because the cooling fluid may reach an area, which is difficult for the cooling fluid to reach, that is, the motor interior-space in an existing structure due to the fluid flow path formed in the rotor sleeve 330 and the fluid spattering path defined by the reflective plate 400.

Accordingly, the present disclosure may prevent the terminal 230 and the coil 210 located in the motor interior-space from being insulation-destructed due to overheating because the cooling fluid may be delivered to the terminal 230 and the coil 210 without using an additional separate device.

Meanwhile, the reflective plate 400 may be coupled to the rotor sleeve 330, may be formed to extend in the radial direction "R", and may have a ring shape. Here, the description that the reflective plate 400 extends in the radial direction "R" does not mean only a case, in which the reflective plate 400 extends in parallel to the radial direction "R", but also has to be construed that it also includes a case, in which the reflective plate 400 extends in the radial direction "R" as a whole while having a specific angle with respect to the radial direction "R" as illustrated in FIG. 3 and the like.

In detail, an inner end of the reflective plate 400 in the radial direction "R" may be fixed to the rotor sleeve 330, and thus the reflective plate 400 and the rotor sleeve 330 may be configured to be rotated together. Furthermore, an outer end of the reflective plate 400 in the radial direction "R" may extend to face a periphery of the stator 200, and thus the cooling fluid may be guided to spatter toward the coil 210, the terminal 230, and the like.

Meanwhile, the rotor sleeve 330 may include a boss part 360, a radius part 350, and a sleeve body part 340.

The shaft hole 362 may be formed in the boss part 360, and may be coupled to the housing cover 130 to be rotatable. For example, a bearing may be installed between the boss part 360 and the housing cover 130, and the boss part 360 may be configured to be rotated with respect to the housing part 100.

The radius part 350 may extend from the boss part 360 in the radial direction "R". The rotor sleeve 330 may be divided into a front area and a rear area by the radius part 350.

The sleeve body part 340 may extend from an end of the radius part 350 and may have a cylindrical shape, and the rotor core 310 may be assembled on an outer peripheral surface of the sleeve body part 340. In detail, an inner surface of the sleeve body part 340 may be integrally formed with the radius part 350, and an outer peripheral surface of the sleeve body part 340 may be adhered to an inner peripheral surface of the rotor core 310. Here, the front space part may be surrounded by an inner surface of the sleeve body part 340, a front surface of the radius part 350, and a front surface of the boss part 360.

In more detail, the sleeve body part 340 may include a body 341, a communication hole 342 that passes through the body 341 to be communicated with the front space part, and a flow groove 343 formed concavely on an outer surface of the body 341 to be communicated with the communication hole 342 and formed to extend from the communication hole 342 in the direction that faces the housing cover 130. Furthermore, the fluid flow path may be implemented by the communication hole 342 and the flow groove 343.

For example, the flow groove 343 may be recessed on an outer surface of the sleeve body part 340, and may extend in a direction that is parallel to the axial direction AX. A front end of the flow groove 343 may be connected to the communication hole 342, and a rear end of the flow groove 343 may extend to an end of the sleeve body part 340. When the rotor assembly 300 is rotated, the cooling fluid may pass through the rotor sleeve 330 through the communication hole 342 and may flow to an outside of the rotor sleeve 330. Furthermore, the cooling fluid may flow to a rear side that faces the housing cover 130 through the flow groove 343. The cooling fluid that flows in the direction that faces the housing cover 130 may be ejected from an end of the flow groove 343, and may be reflected by the reflective plate 400 to spatter toward a periphery of the stator 200.

Furthermore, a plurality of flow grooves 343 and a plurality of communication holes 342 may be provided.

Furthermore, the plurality of flow grooves 343 and the plurality of communication holes 342 may be disposed to be spaced apart from each other along a circumferential direction of the sleeve body part 340. Accordingly, the plurality of flow grooves 343 may be formed in parallel to each other. However, the number, the intervals, and the shapes of the flow grooves 343 are not limited to the above-described ones, and may be modified into various shapes as long as the cooling fluid discharged through the communication hole 342 may flow to the motor interior-space.

Meanwhile, according to the first embodiment of the present disclosure, an end of the flow groove 343 in the direction that faces the housing cover 130 may be formed to be inclined to face an outer side in the radial direction "R" as it goes in the direction that faces the housing cover 130 (see FIGS. 2, 3, and 7).

In detail, a rear end of the flow groove 343 may be formed to be deflected toward an outer side in the radial direction "R". Accordingly, the cooling fluid that flows through the fluid flow path may be ejected in a direction that becomes farther away from a central axis. However, the shape of the flow groove 343 is not limited thereto.

Meanwhile, the reflective plate 400 may include a coupling part 410 coupled to the boss part 360, an extension part 420 that extends from the coupling part 410, and a reflection part 430 that extends from an end of the extension part 420 in the radial direction "R" and is configured to face the fluid flow path.

Here, the fluid spattering path may be configured to define a path, along which the cooling fluid that flows via the fluid flow path is reflected by the reflection part 430 to spatter toward a periphery of the stator 200.

In detail, the coupling part 410 may be fixedly coupled to the boss part 360 such that the reflective plate 400 and the rotor sleeve 330 behave integrally. Here, a scheme of fixing the coupling part 410 to the boss part 360 is not limited, and various schemes may be applied.

For example, the boss part 360 may include a coupling recess 361 formed concavely such that an end of the coupling part 410 is inserted thereinto and coupled thereto.

In detail, the coupling recess 361 may be continuously formed along a circumference of an outer surface of the boss part 360, and may have a size that is large enough such that the coupling part 410 may be press-fitted and fastened therewith. The coupling part 410 may be inserted into and coupled to a coupling recess to be press-fitted and fastened therewith, and thus the coupling part 410 may be fixed to the boss part 360.

The extension part 420 is a part that connects the coupling part 410 and the reflection part 430. For example, the extension part 420 may be formed to be inclined such that it becomes farther away from the central axis as it goes in a direction that faces the reflection part 430.

The reflection part 430 is a part, on which the cooling fluid that deviates from the flow groove 343 is reflected, and an outer end thereof in the radial direction "R" may extend toward a cooling target (for example, the coil 210, the terminal 230, and the like). When a surface of the reflection part 430, which faces the rotor assembly 300, is referred to as a reflective surface, the cooling fluid may be reflected by the reflective surface and may be guided by the coil 210, the terminal 230, and the like. For example, an outer end of the reflection part 430 in the radial direction "R" may extend to at least the one-side coil end, but the present disclosure is not limited thereto.

The reflection part 430 may be provided to be closer to the housing cover 130 than to the coupling part 410 with respect to the axial direction AX. Furthermore, the extension part 420 may be formed to be inclined to face an outer side in the radial direction "R" as it goes in the direction that faces the reflection part 430. In detail, the reflection part 430 may be spaced apart from the coupling part 410 in the radial direction, and may be disposed to a location that is closer to the housing cover 130 than to the coupling part 410. This may be implemented by forming the extension part 420 such that the extension part 420 is inclined to an outer side in the radial direction as it faces the housing cover 130.

Furthermore, the reflection part 430 may be formed to be curved in the direction that faces the housing cover 130.

In detail, the reflective surface of the reflection part 430 may be formed to have a curved shape, and the reflective surface may be formed to have a shape that is convex toward the housing cover 130. Due to the shape of the reflection part 430, a larger amount of the cooling fluid may reach the coil 210 and the terminal 230. However, the shape of the reflection part 430 is not limited thereto, and may be variously modified in consideration of the shape of the motor interior-space and the components disposed therein.

Figure 8:
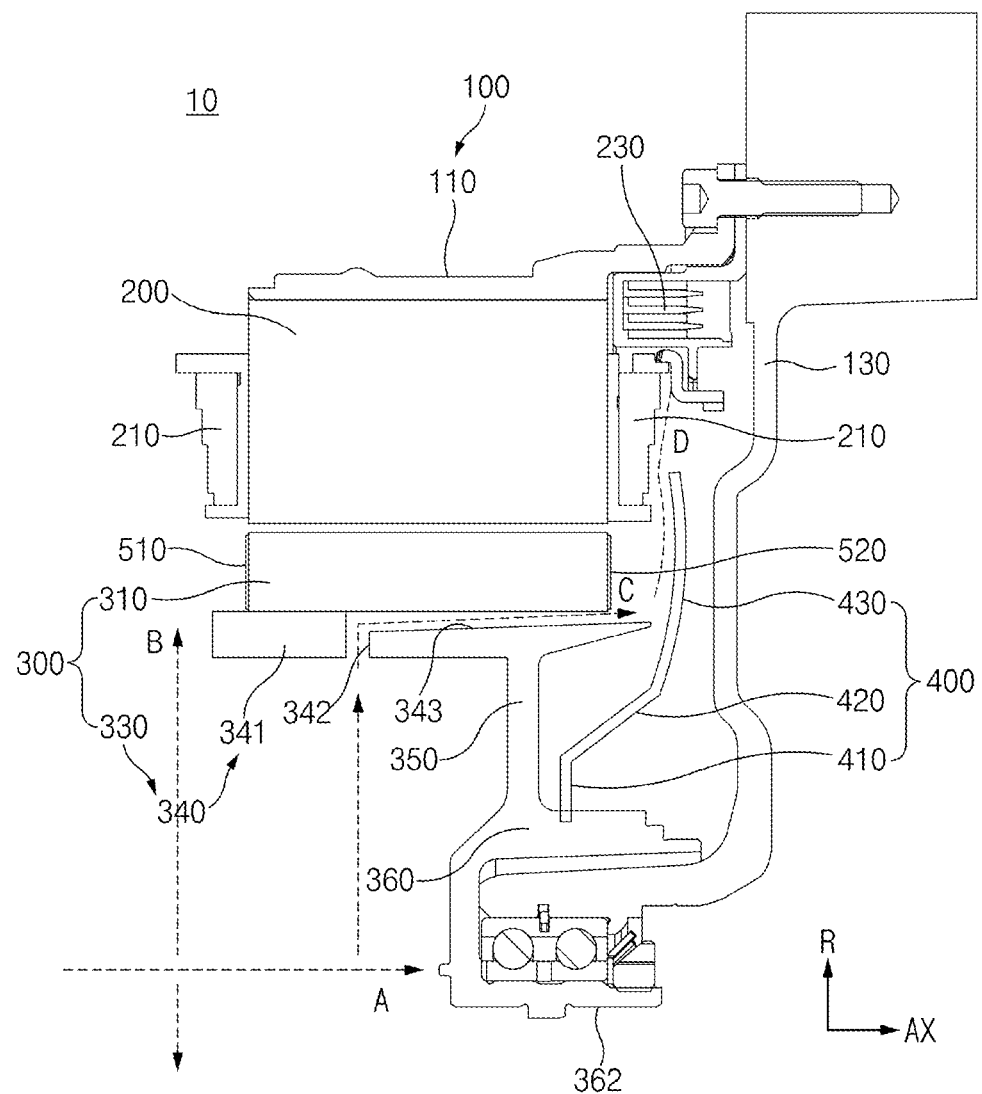
FIG. 8 is a cross-sectional view illustrating a portion of a motor according to a first modification of a first embodiment of the present disclosure.
Figure 9:
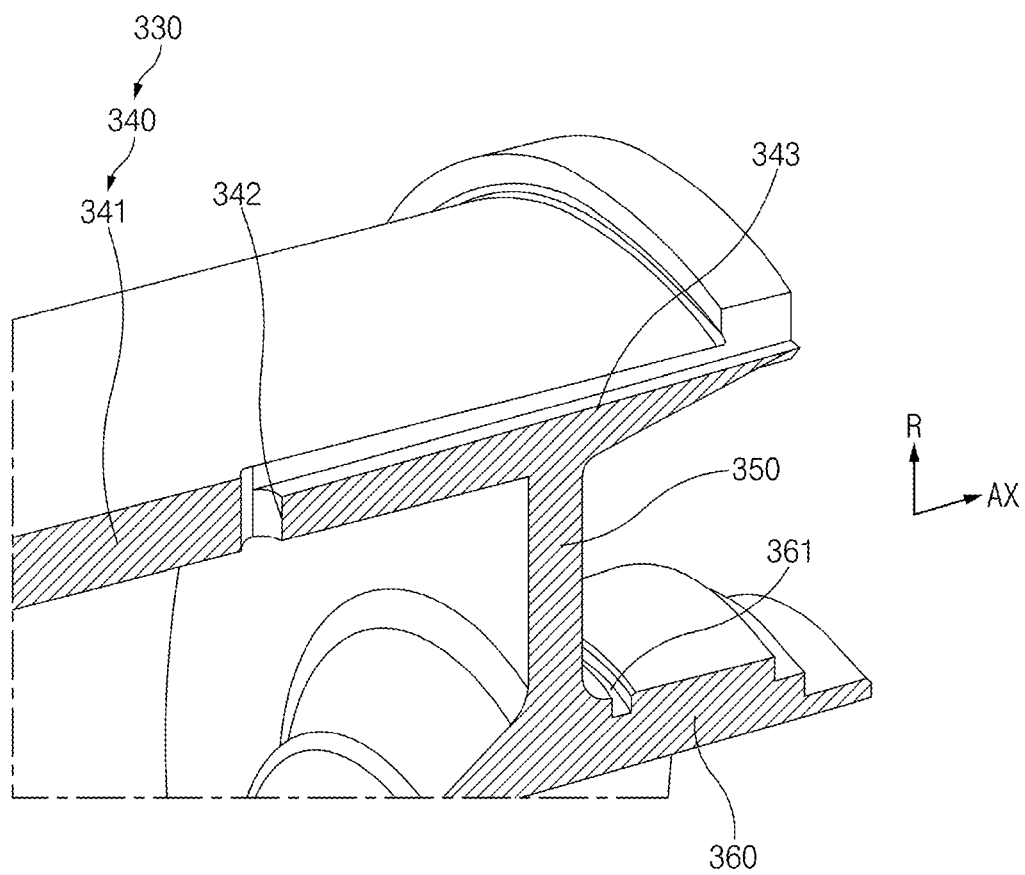
FIG. 9 is a cross-sectional perspective view illustrating a portion of a rotor sleeve according to a first modification of a first embodiment of the present disclosure.

Meanwhile, hereinafter, the motor 10 according to a first modification of the first embodiment of the present disclosure will be described with reference to FIGS. 8 and 9. FIG. 8 is a cross-sectional view illustrating a portion of the motor according to the first modification of the first embodiment of the present disclosure. FIG. 9 is a cross-sectional perspective view illustrating a portion of a rotor sleeve according to the first modification of the first embodiment of the present disclosure.

The motor 10 according to the first modification of the first embodiment of the present disclosure is different from that of the first embodiment in the shape of the flow groove 343 of the rotor sleeve 330. Accordingly, all the configurations of the first embodiment, except for the above-described differences, may be included. Hereinafter, a repeated description of the same configurations as the above-described ones will be omitted.

According to the first modification of the first embodiment of the present disclosure, an end of the flow groove 343 in the direction that faces the housing cover 130 may extend straight in the direction that faces the housing cover 130.

In detail, a rear end of the flow groove 343 may not be deflected but may have a straight shape to be parallel to the axial direction AX. Accordingly, it may be easy to manufacture the flow groove 343. Even when the flow groove 343 is formed straight, the cooling fluid that deviates from the flow groove 343 may spatter to an outer side in the radial direction "R" due to the rotation of the rotor assembly 300. Furthermore, because the cooling fluid is guided by the reflection part 430 and flows to the fluid spattering path, it may spatter to the periphery of the stator 200 even when the flow groove 343 is formed straight.

Figure 10:
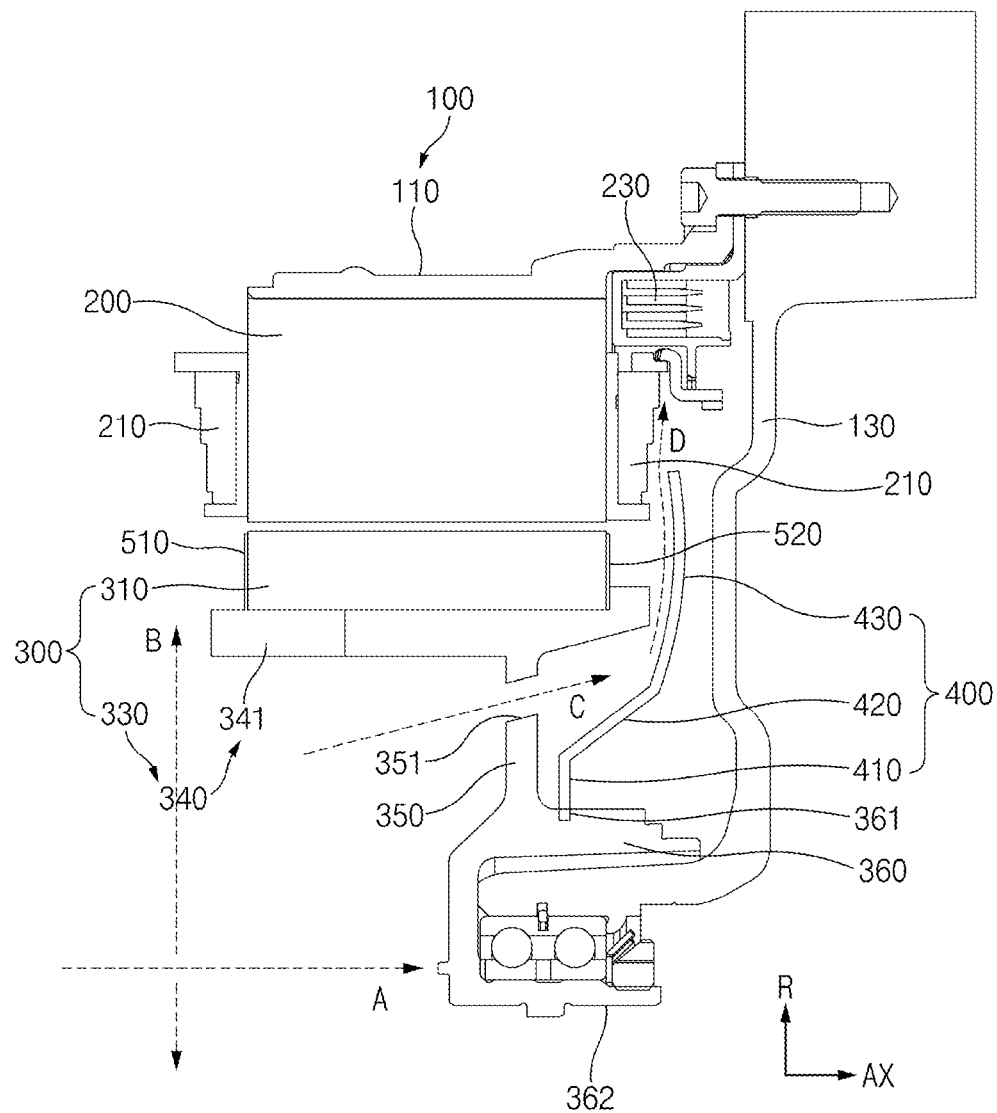
FIG. 10 is a cross-sectional view illustrating a portion of a motor according to a second modification of a first embodiment of the present disclosure.
Figure 11:
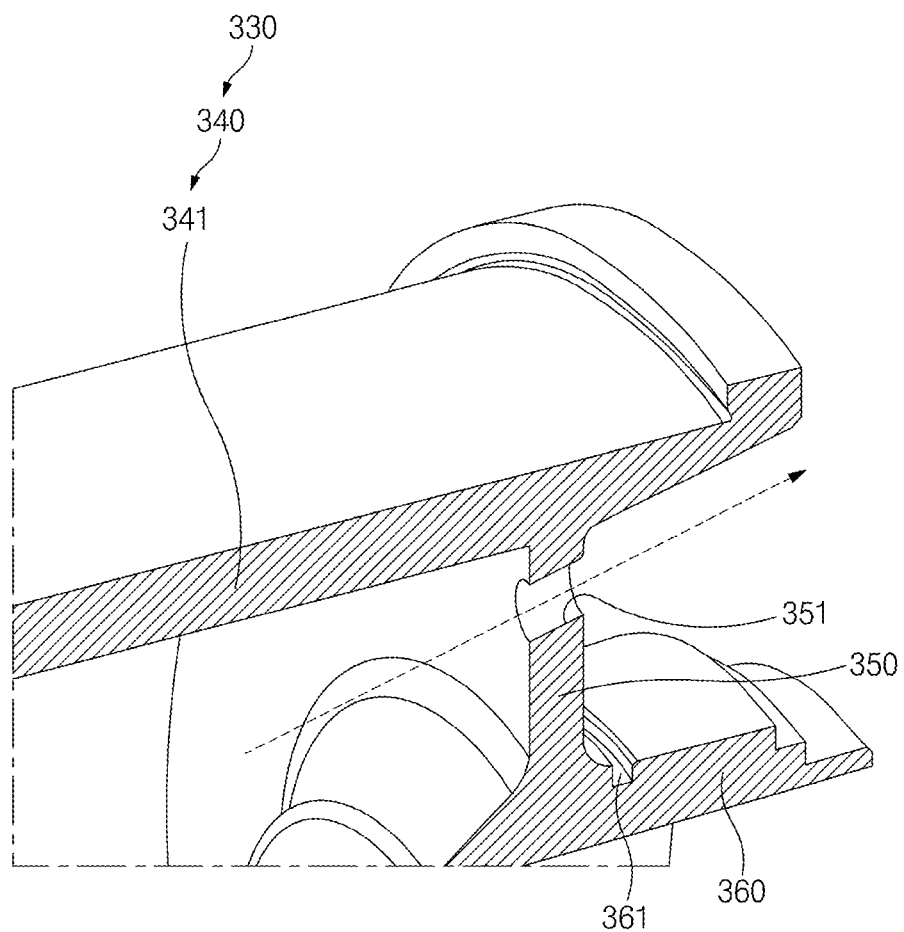
FIG. 11 is a cross-sectional perspective view illustrating a portion of a rotor sleeve according to a second modification of a first embodiment of the present disclosure.

Meanwhile, hereinafter, the motor 10 according to a second modification of the first embodiment of the present disclosure will be described with reference to FIGS. 10 and 11. FIG. 10 is a cross-sectional view illustrating a portion of the motor according to the second modification of the first embodiment of the present disclosure. FIG. 11 is a cross-sectional perspective view illustrating a portion of a rotor sleeve according to the second modification of the first embodiment of the present disclosure.

The motor 10 according to the second modification of the first embodiment of the present disclosure is different from that of the first embodiment in the shape of the rotor sleeve 330. That is, a scheme of implementing the fluid flow path is different. Accordingly, all the configurations of the first embodiment, except for the above-described differences, may be included. Hereinafter, a repeated description of the same configurations as the above-described ones will be omitted.

According to the second modification of the first embodiment of the present disclosure, a spattering hole 351 may pass through the radius part 350, and the fluid flow path may be implemented by the spattering hole 351.

In detail, neither the communication hole 342 nor the flow groove 343 may be formed in the rotor sleeve 330 according to the second modification of the first embodiment, and instead, the spattering hole 351 may be formed in the radius part 350 of the rotor sleeve 330 to define the fluid flow path. The spattering hole 351 may pass through the radius part 350 to communicate a front surface and a rear surface of the rotor sleeve 330.

The cooling fluid supplied to the front space part may flow to the motor interior-space through the spattering hole 351. Furthermore, the cooling fluid that passes through the spattering hole 351 may be reflected by the reflection part 430, and may reach the periphery of the stator 200, for example, the coil 210, the terminal 230, and the like.

For example, the spattering hole 351 may be formed to be inclined toward an outer side in the radial direction as it goes in the direction that faces the housing cover 130. Accordingly, the cooling fluid that passes through the spattering hole 351 may spatter in a direction that becomes farther away from the central axis. However, the shape of the spattering hole 351 is not limited thereto.

Second Embodiment

Hereinafter, a motor 10a according to a second embodiment of the present disclosure will be described with reference to FIGS. 12 to 20.

Figure 12:
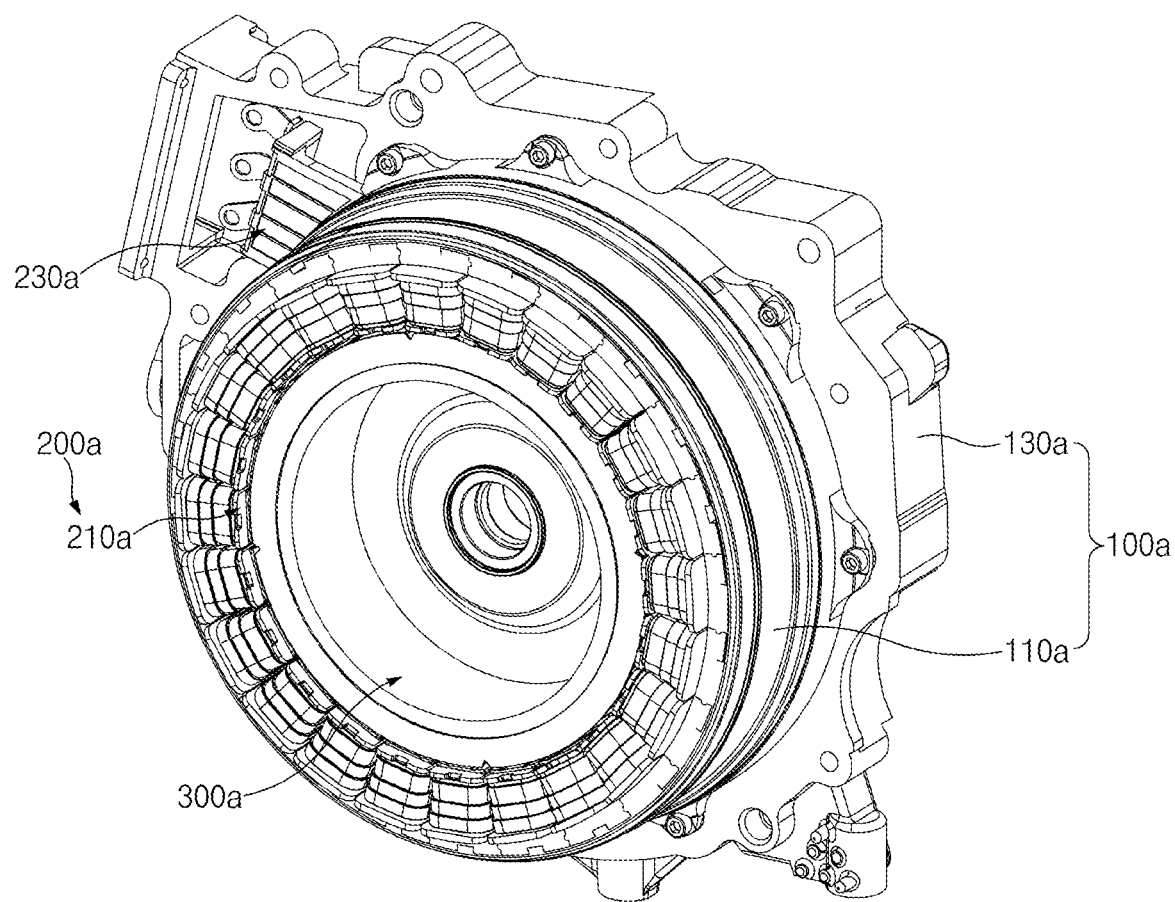
FIG. 12 is a perspective view illustrating a motor according to a second embodiment of the present disclosure.
Figure 13:
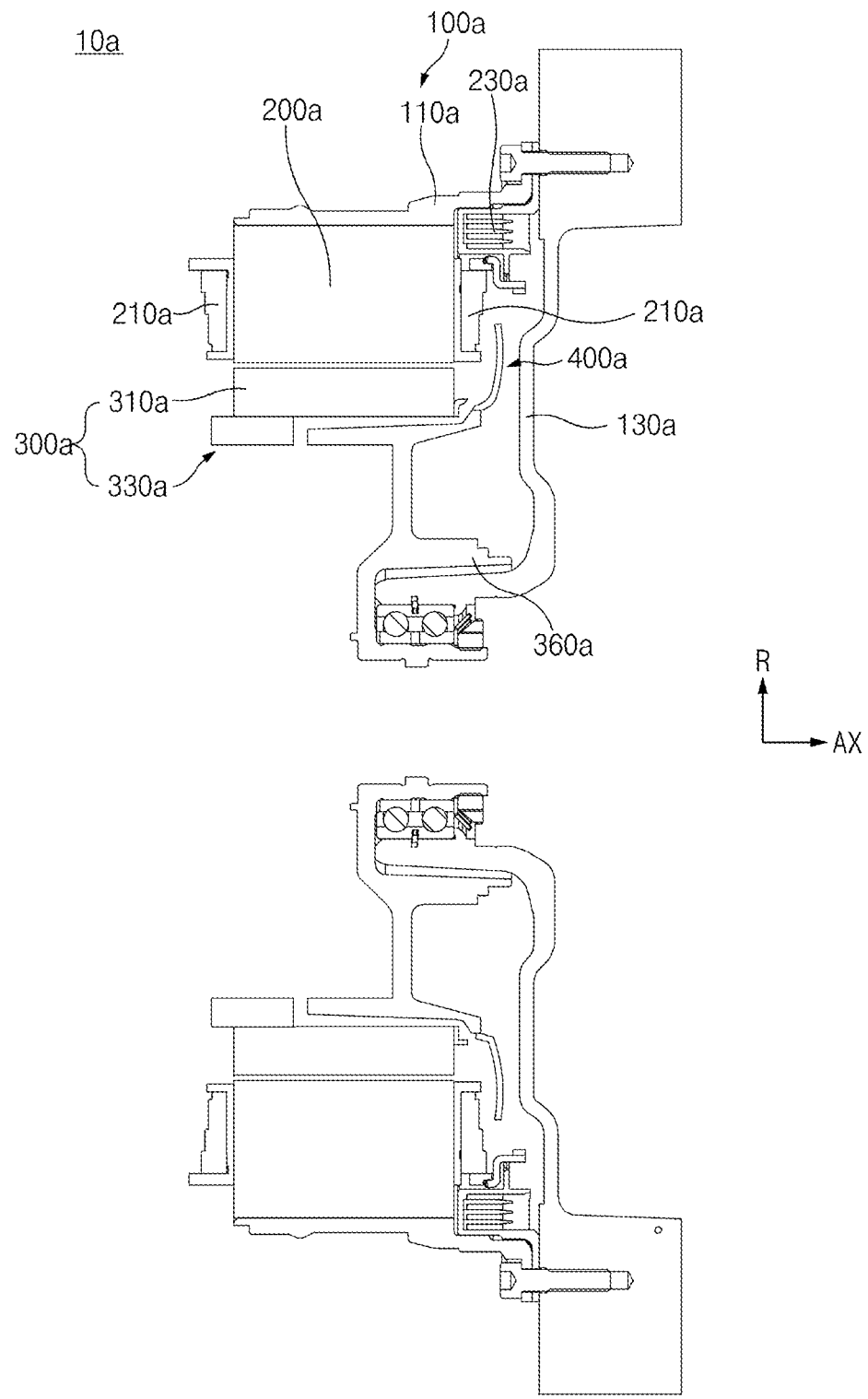
FIG. 13 is a cross-sectional view of a cross-section of a motor according to a second embodiment of the present disclosure.
Figure 14:
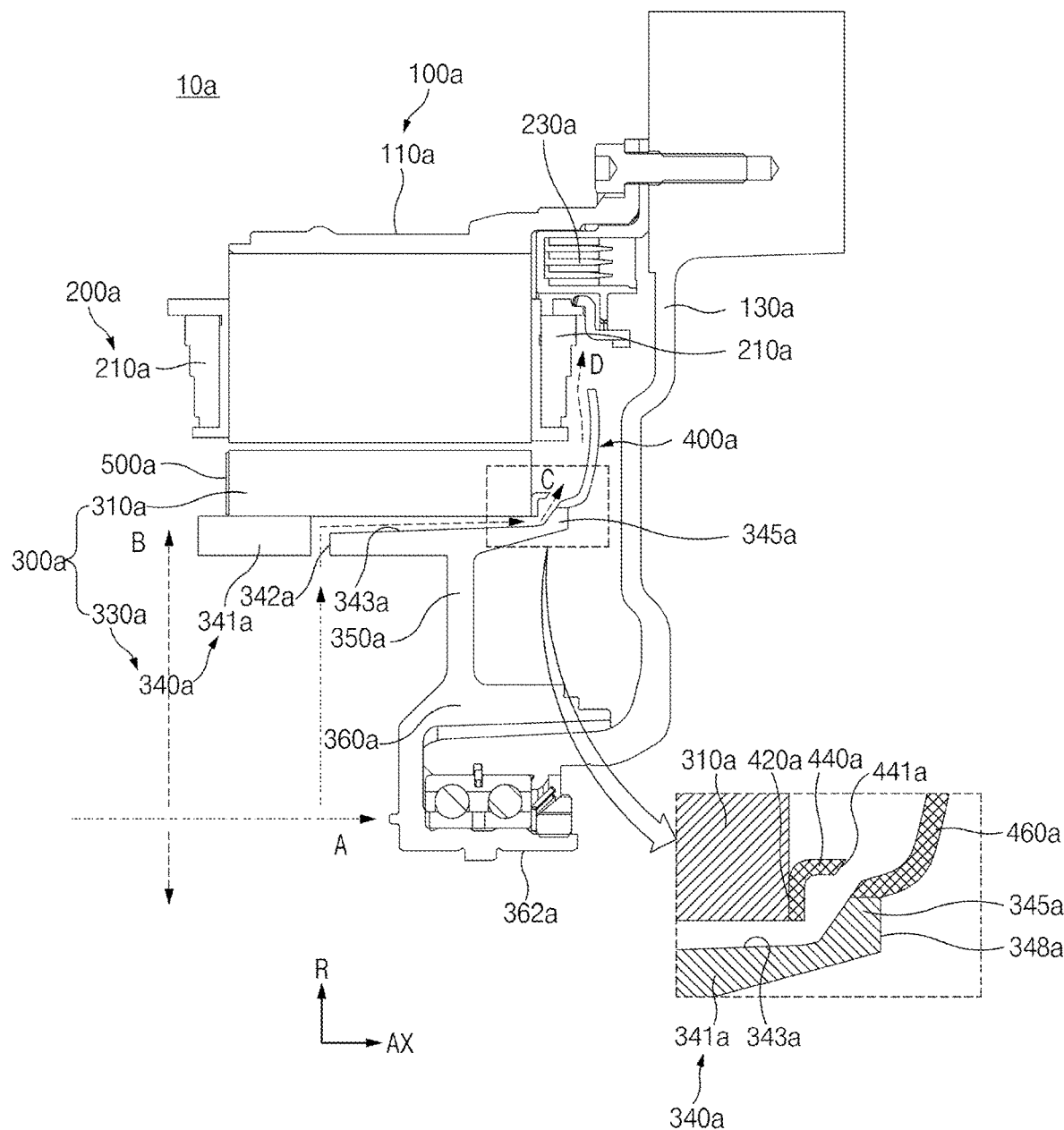
FIG. 14 is a cross-sectional view illustrating a portion of a motor according to a second embodiment of the present disclosure, and is an enlarged cross-sectional view of a portion of FIG. 13.
Figure 15:
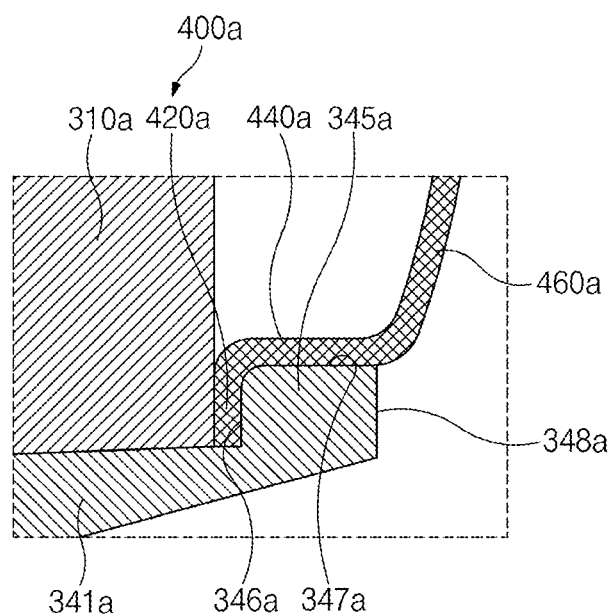
FIG. 15 is an enlarged cross-sectional view illustrating a coupling part of a rotor assembly and a reflective plate, and is a view illustrating a part, in which no flow groove is formed.
Figure 16:
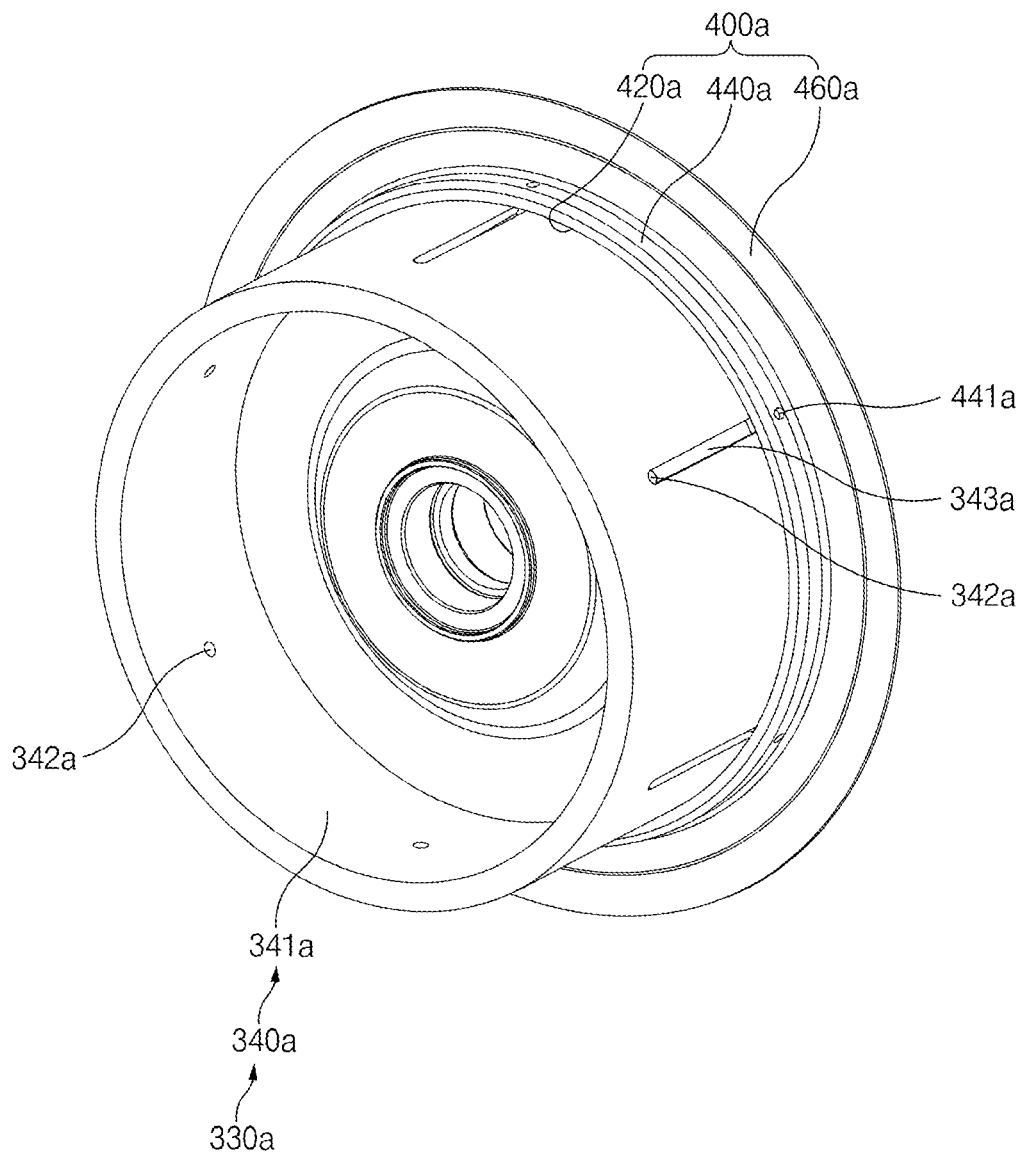
FIG. 16 is a perspective view illustrating a state, in which a rotor sleeve and a reflective plate according to a second embodiment of the present disclosure are coupled each other, when viewed from a front side.
Figure 17:
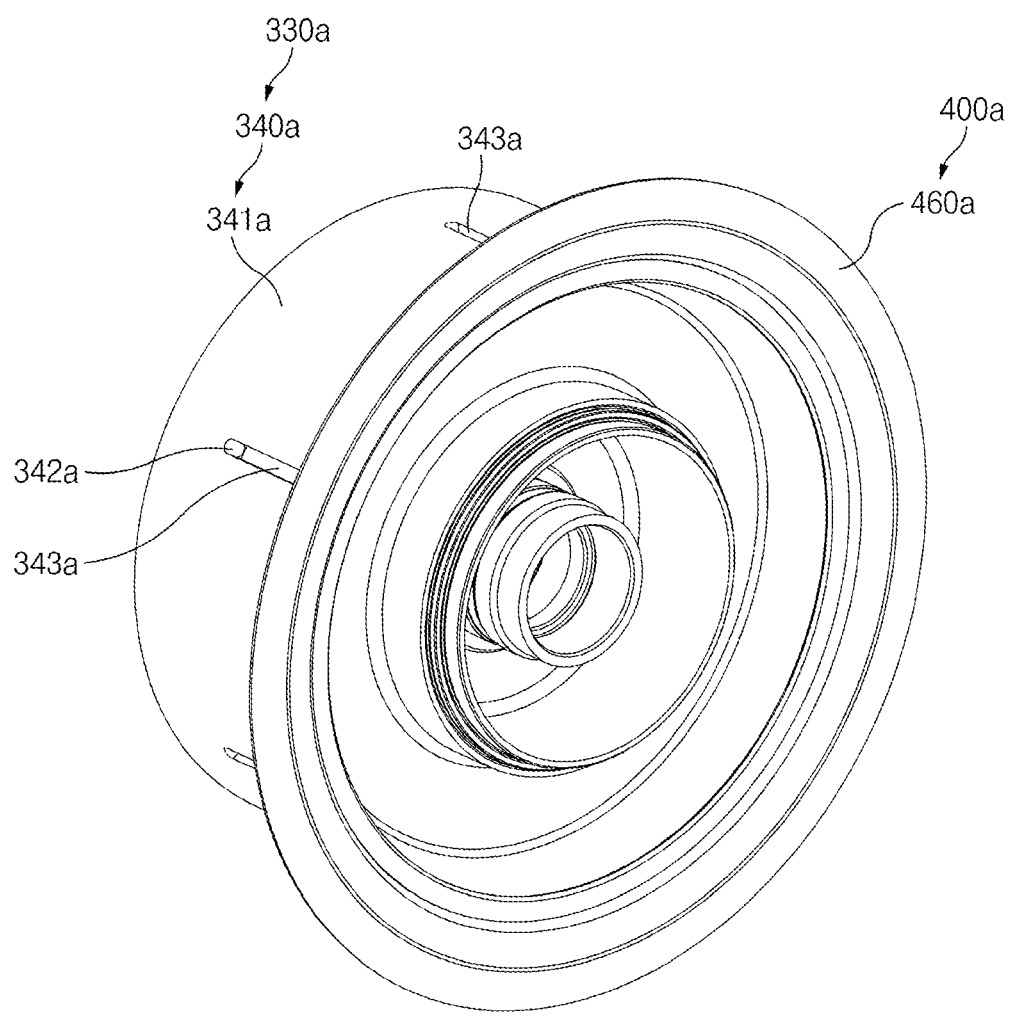
FIG. 17 is a perspective view illustrating a state, in which a rotor sleeve and a reflective plate according to a second embodiment of the present disclosure are coupled each other, when viewed from a rear side.
Figure 18:
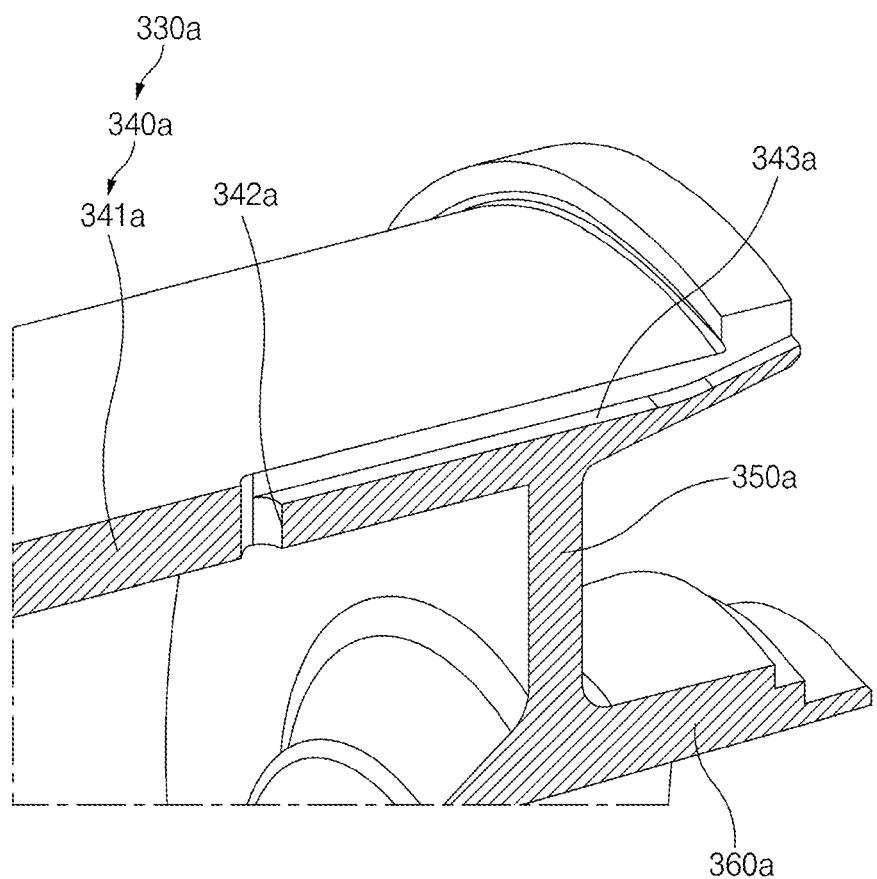
FIG. 18 is a cross-sectional perspective view illustrating a portion of a rotor sleeve according to a second embodiment of the present disclosure.
Figure 19:
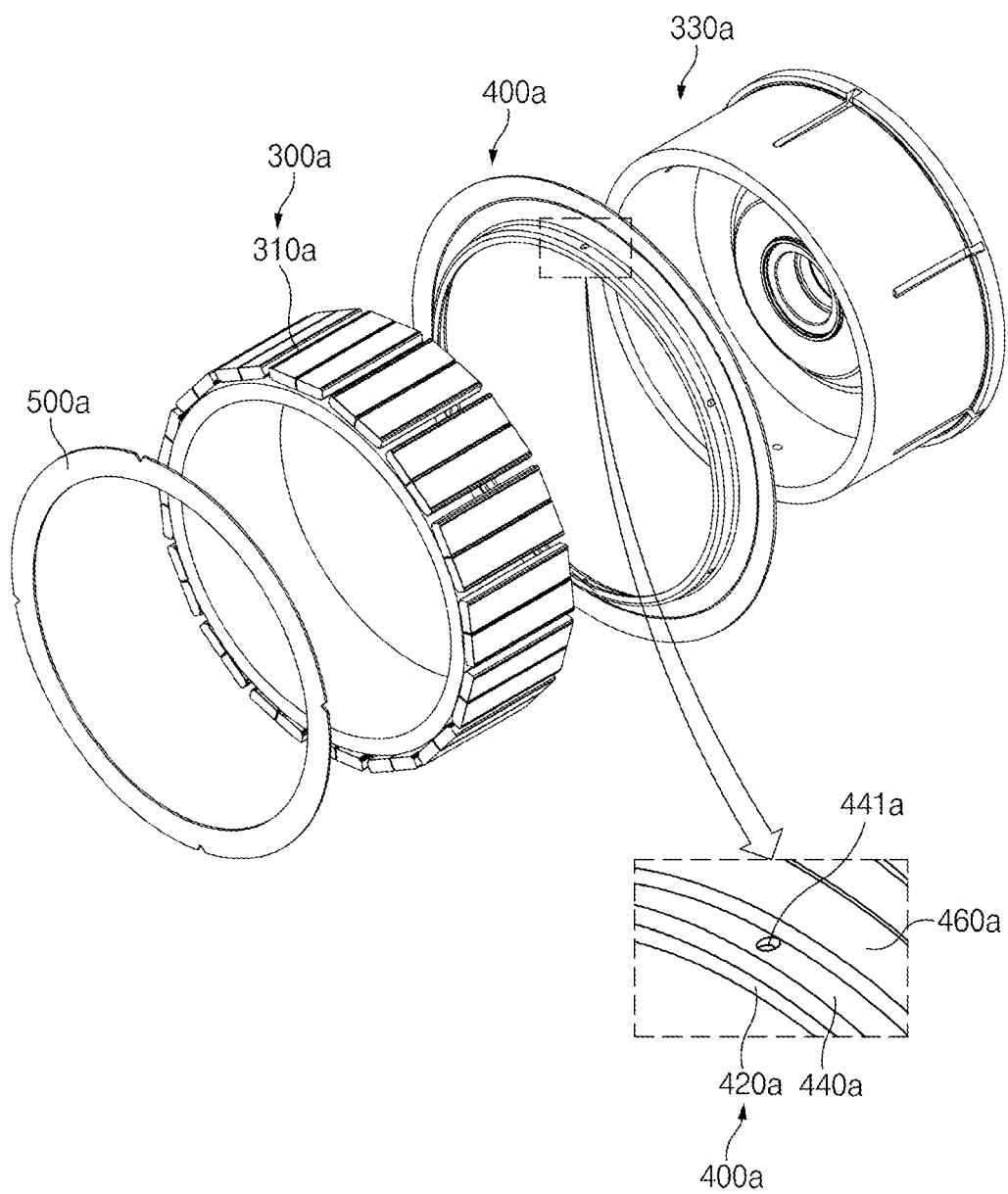
FIG. 19 illustrates an exploded perspective illustrating a rotor assembly, a reflective plate, and a front end plate according to a second embodiment of the present disclosure, and an enlarged perspective view of a reflective plate.
Figure 20:
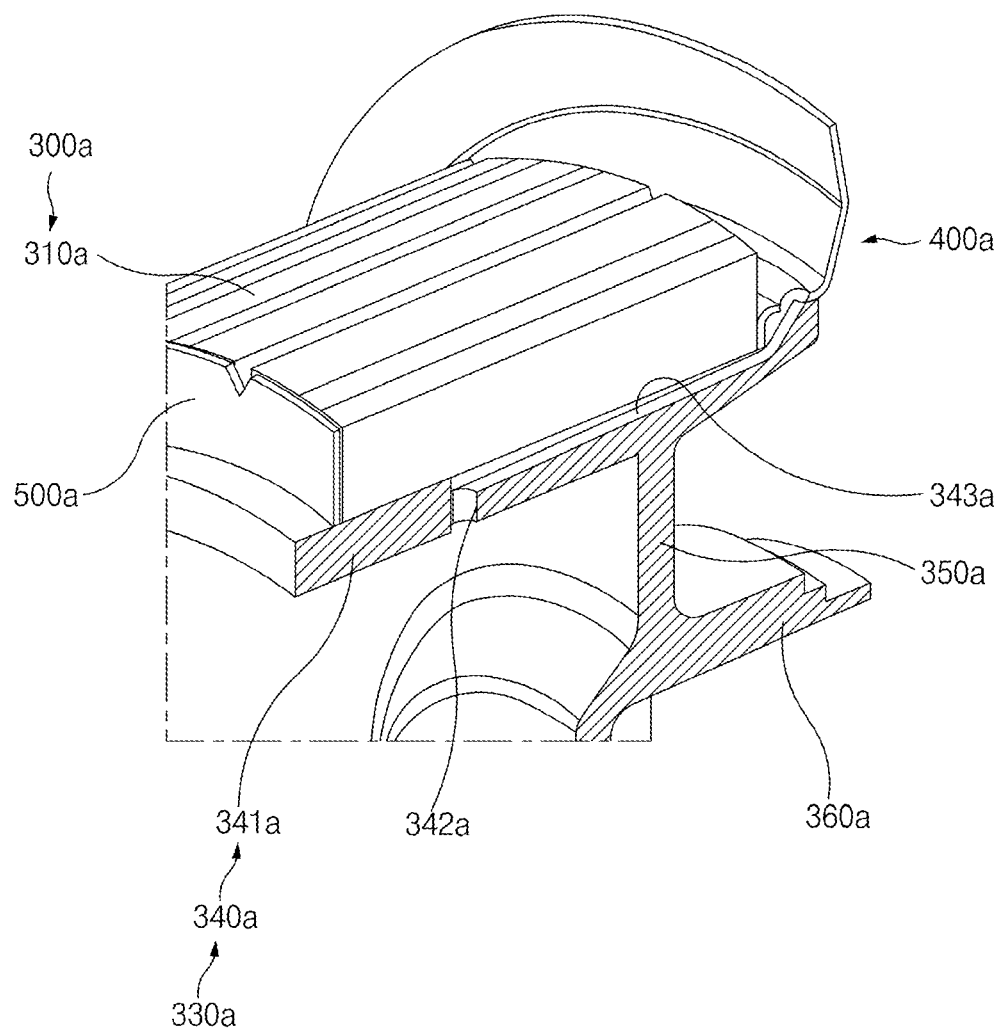
FIG. 20 is a partially enlarged cross-sectional perspective view illustrating a state, in which a rotor assembly, a reflective plate, and a front end plate illustrated in FIG. 19 are coupled to each other.

FIG. 12 is a perspective view illustrating the motor according to the second embodiment of the present disclosure. FIG. 13 is a cross-sectional view of a cross-section of the motor according to the second embodiment of the present disclosure. FIG. 14 is a cross-sectional view illustrating a portion of the motor according to the second embodiment of the present disclosure, and is an enlarged cross-sectional view of a portion of FIG. 13. FIG. 15 is an enlarged cross-sectional view illustrating a coupling part of a rotor assembly and a reflective plate, and is a view illustrating a part, in which no flow groove is formed. FIG. 16 is a perspective view illustrating a state, in which a rotor sleeve and a reflective plate according to the second embodiment of the present disclosure are coupled each other, when viewed from a front side. FIG. 17 is a perspective view illustrating a state, in which the rotor sleeve and the reflective plate according to the second embodiment of the present disclosure are coupled each other, when viewed from a rear side. FIG. 18 is a cross-sectional perspective view illustrating a portion of the rotor sleeve according to the second embodiment of the present disclosure. FIG. 19 illustrates an exploded perspective illustrating the rotor assembly, the reflective plate, and a front end plate according to the second embodiment of the present disclosure, and an enlarged perspective view of the reflective plate. FIG. 20 is a partially enlarged cross-sectional perspective view illustrating a state, in which the rotor assembly, the reflective plate, and the front end plate illustrated in FIG. 19 are coupled to each other.

Referring to FIGS. 12 to 20, the motor 10*a* according to the second embodiment of the present disclosure includes a housing part 100*a*, a stator 200*a*, a rotor assembly 300*a*, and a reflective plate 400*a*.

The housing part 100*a* includes a housing body 110*a*, and a housing cover 130*a* that is configured to cover one side of the housing body 110*a*.

The housing body 110 may have a hollow ring shape or a cylindrical shape, and may be coupled and adhered to an outer peripheral surface of the stator 200*a* to surround it. The housing body 110*a* may be formed such that opposite ends thereof in an axial direction AX are opened. Here, the axial direction AX of the housing body 110*a* may coincide with an axial direction AX of the stator 200*a*, an axial direction AX of the rotor assembly 300*a*, and a central axis direction AX of the reflective plate 400*a*. Hereinafter, their general term will be referred to the axial direction AX.

The housing cover 130*a* may be coupled to the housing body 110*a* to cover the one side of the housing body 110*a* in the axial direction AX. The housing cover 130*a* has a through-hole such that an output shaft passes therethrough.

The stator 200*a* is provided in an interior of the housing body 110*a*. For example, the stator 200*a* may be installed while being fixed in the interior of the housing body 110*a*. The stator 200*a* may include a coil 210*a* installed in a bobbin, and a terminal 230*a* that is electrically connected to the coil 210*a*. The coil 210*a* may be magnetized when an electric voltage is applied to the terminal 230*a* from an external power source. When an end of the coil 210*a*, which faces the housing cover 130*a*, is defined as a one-side coil end and an end of the coil 210*a* in an opposite direction to a direction that faces the housing cover 130*a* is defined as an opposite-side coil end, the one-side coil end may be covered by the housing cover 130*a*.

The rotor assembly 300*a* is accommodated inside the stator 200*a* to be rotatable, and has a fluid flow path for causing a cooling fluid introduced to a front side thereof to flow into a rear side that faces the housing cover 130*a*.

In detail, the bobbin, on which the coil 210*a* is wound, may be installed to surround the rotor assembly 300*a*, and the rotor assembly 300*a* may be rotated when electric power is supplied to the coil 210*a*. Through the rotation of the rotor assembly 300*a*, the motor 10*a* outputs a torque as the output shaft connected to a shaft hole 362*a* of the rotor assembly 300*a* is rotated. Hereinafter, a rearward direction of the motor 10*a* or the rotor assembly 300*a* is defined as a direction that faces the housing cover 130*a* from the rotor assembly 300*a*, and a forward direction of the motor 10*a* or the rotor assembly 300*a* is defined as an opposite direction to a direction that faces the housing cover 130*a* from the rotor assembly 300*a*. Furthermore, a space between rear surfaces of the rotor assembly 300*a* and the stator 200*a*, and the housing cover 130*a* is defined as a motor interior-space. As in the illustrated embodiment, the one-side coil end and the terminal 230*a* may be located in the motor interior-space.

The rotor assembly 300*a* may include a rotor core 310*a* and a rotor sleeve 330*a*.

A through-hole may be formed in an interior of the rotor core 310*a* may in the axial direction AX. The rotor core 310*a* may be configured to be rotated because an inductive current is generated when a current is applied to the coil 210*a* of the stator 200*a*. A first end plate 510*a* and a second end plate 520*a* may be provided on opposite ends of the rotor core 310*a*.

The rotor sleeve 330*a* may pass through the through-hole to be coupled to the rotor core 310*a*, and the shaft hole 362*a* that extends in the axial direction AX and a front space part that is opened in an opposite direction to the direction that faces the housing cover 130*a* may be formed in the rotor sleeve 330*a*. In detail, the rotor sleeve 330*a* is an element that is adhered to an inner peripheral surface of the rotor core 310*a* and is rotated together with the rotor core 310*a*, and is an element, an output shaft of which is connected to the shaft hole 362*a* such that a rotational force of the rotor core 310*a* is transmitted to the output shaft. The front space part may be formed on a front surface of the rotor sleeve 330*a*, and a rear surface of the rotor sleeve 330*a* may be coupled to the housing cover 130*a* to be rotatable.

Here, the fluid flow path may be implemented by the rotor sleeve 330*a*, may be implemented by the rotor sleeve 330*a* and the rotor core 310*a*, and may be configured to be communicated with the front space part and the motor interior-space. That is, the cooling fluid that flows through the front space part may flow in the direction that faces the housing cover 130*a* through the fluid flow path.

For example, referring to FIGS. 12 to 14, the cooling fluid may be supplied through a cooling channel (not illustrated) provided in the stator 200*a* or the housing body 110*a*, and may be supplied to the front space part of the rotor sleeve 330*a* by a pump (not illustrated) (see flow "A" of FIG. 14). The cooling fluid supplied to the front space part of the rotor sleeve 330*a* may spatter to a radial direction "R" of the rotor assembly 300*a* when the rotor assembly 300*a* is rotated to cool the rotor core 310*a* on an outer side of the rotor sleeve 330*a* and the coil 210*a* of the stator 200*a* (see flow "B" of FIG. 14).

Furthermore, the fluid flow path is formed in the rotor sleeve 330*a* and the rotor core 310*a* according to an embodiment of the present disclosure, and thus the cooling fluid supplied to the front space part may flow in the direction that faces the housing cover 130*a*, that is, to the motor interior-space. In detail, the cooling fluid that spatters toward an inner surface of the rotor sleeve 330*a* in the front space part due to a centrifugal force when the rotor assembly 300*a* is rotated may be guided by the fluid flow path formed in the rotor sleeve 330*a* and may flow to the motor interior-space (see flow "C" of FIG. 14).

Furthermore, the reflective plate 400*a* is assembled at an end of the rotor assembly 300*a*, which faces the housing cover 130*a* of the rotor assembly 300*a*, and is configured to define a fluid spattering path that is connected to the fluid flow path and spatters the cooling fluid that flows through the fluid flow path in the radial direction "R". Furthermore, a fluid hole 441*a* that communicates the fluid flow path and the fluid spattering path is formed in the reflective plate 400*a*.

In detail, the cooling fluid reaches the motor interior-space through the fluid flow path, the reached cooling fluid may be reflected by the reflective plate 400*a* and may spatter in the radial direction "R" (see flow "D" of FIG. 14). Then, the cooling fluid also may flow in the radial direction "R" by the centrifugal force due to the rotation of the rotor assembly 300*a*, but the reflective plate 400*a* may function to define the fluid spattering path such that the spattering cooling fluid spatters toward the terminal 230*a* or the one-side coil end. That is, the fluid spattering path may be a path for guiding the flowing cooling fluid toward a periphery of the stator 200*a*, that is, in a direction that faces the coil 210*a* and the terminal 230*a*.

Then, the fluid flow path and the fluid spattering path may be communicated with each other through the fluid hole 441*a* that passes through the reflective plate 400*a*. In detail, the fluid hole 441*a* is connected to a rear end of the fluid flow path, and is communicated with the fluid spattering path. The cooling fluid that passes through the fluid flow path through the fluid hole 441*a* may stably flow toward the reflective plate 400*a*.

In this way, the present disclosure may effectively cool components located in the motor interior-space because the cooling fluid may reach an area, which is difficult for the cooling fluid to reach, that is, the motor interior-space in an existing structure due to the fluid flow path formed in the rotor core 310*a* and the rotor sleeve 330*a*, and the fluid spattering path defined by the reflective plate 400*a*.

Accordingly, the present disclosure may prevent the terminal 230*a* and the coil 210*a* located in the motor interior-space from being insulation-destructed due to overheating because the cooling fluid may be delivered to the terminal 230*a* and the coil 210*a* without using an additional separate device.

Meanwhile, the reflective plate 400*a* may be coupled to the rotor sleeve 330*a*, may be formed to extend in the radial direction "R", and may have a ring shape. Here, the description that the reflective plate 400*a* extends in the radial direction "R" does not mean only a case, in which the reflective plate 400*a* extends perpendicularly to an outer surface of the rotor sleeve 330*a*, but also has to be construed that it also includes a case, in which the reflective plate 400*a* extends in the radial direction "R" as a whole while having a specific angle with respect to the radial direction "R" as illustrated in FIG. 14 and the like.

In detail, an inner end of the reflective plate 400*a* in the radial direction "R" may be fixed to the rotor sleeve 330*a*, and thus the reflective plate 400*a* and the rotor sleeve 330*a* may be configured to be rotated together. Furthermore, an outer end of the reflective plate 400*a* in the radial direction "R" may extend to face a periphery of the stator 200*a*, and thus the cooling fluid may be guided to spatter toward the coil 210*a*, the terminal 230*a*, and the like.

Meanwhile, the rotor sleeve 330*a* may include a boss part 360*a*, a radius part 350*a*, and a sleeve body part 340*a*.

The shaft hole 362*a* may be formed in the boss part 360*a*, and may be coupled to the housing cover 130*a* to be rotatable.

For example, a bearing may be installed between the boss part 360*a* and the housing cover 130*a*, and the boss part 360*a* may be configured to be rotated with respect to the housing part 100*a*.

The radius part 350*a* may extend from the boss part 360*a* in the radial direction "R". The rotor sleeve 330*a* may be divided into a front area and a rear area by the radius part 350*a*.

The sleeve body part 340*a* may extend from an end of the radius part 350*a* and may have a cylindrical shape, and the rotor core 310*a* may be assembled on an outer peripheral surface of the sleeve body part 340*a*. In detail, an inner surface of the sleeve body part 340*a* may be integrally formed with the radius part 350*a*, and an outer peripheral surface of the sleeve body part 340*a* may be adhered to an inner peripheral surface of the rotor core 310*a*. Here, the front space part may be surrounded by an inner surface of the sleeve body part 340*a*, a front surface of the radius part 350*a*, and a front surface of the boss part 360*a*.

In more detail, the sleeve body part 340*a* may include body 342*a*, a communication hole 342*a* that passes through the body 341*a* to be communicated with the front space part, and a flow groove 343*a* formed concavely on an outer surface of the body 341*a* to be communicated with the communication hole 342*a* and formed to extend from the communication hole 342*a* in the direction that faces the housing cover 130*a*. Furthermore, the fluid flow path may be implemented by the communication hole 342*a* and the flow groove 343*a*.

For example, the flow groove 343*a* may be recessed on an outer surface of the sleeve body part 340*a*, and may extend in a direction that is parallel to the axial direction AX. A front end of the flow groove 343*a* may be connected to the communication hole 342*a*, and a rear end of the flow groove 343*a* may extend to an end of the sleeve body part 340*a*. When the rotor assembly 300*a* is rotated, the cooling fluid may pass through the rotor sleeve 330*a* through the communication hole 342*a* and may flow to an outside of the rotor sleeve 330*a*. Furthermore, the cooling fluid may flow to a rear side that faces the housing cover 130*a* through the flow groove 343*a*. The cooling fluid that flows in the direction that faces the housing cover 130*a* may be ejected from an end of the flow groove 343*a*, and may be reflected by the reflective plate 400*a* to spatter toward a periphery of the stator 200*a*.

Furthermore, a plurality of flow grooves 343*a* and a plurality of communication holes 342*a* may be provided. Furthermore, the plurality of flow grooves 343*a* and the plurality of communication holes 342*a* may be disposed to be spaced apart from each other along a circumferential direction of the sleeve body part 340*a*. Accordingly, the plurality of flow grooves 343*a* may be formed in parallel to each other. However, the number, the intervals, and the shapes of the flow grooves 343*a* are not limited to the above-described ones, and may be modified into various shapes as long as the cooling fluid discharged through the communication hole 342*a* may flow to the motor interior-space.

The sleeve body part 340*a* may further include a flange 345*a*. The flange 345*a* may be provided at an end of the body 341*a*, which faces the housing cover 130*a*, to protrude in the radial direction "R" so as to be stepped from an outer surface of the body 341*a*.

In detail, the flange 345a is a part, in which the reflective plate 400a is assembled, and may be formed at an end of the body 341a in the direction that faces the housing cover 130a. The flange 345a may be formed along a circumference of an outer surface of a rear end of the body 341a to protrude. Accordingly, the flange 345a may be stepped from an outer surface of the body 341a, at another portion thereof.

Furthermore, an end of the flow groove 343a may be communicated with a surface of the flange 345a, which faces the radial direction "R". In detail, the flow groove 343a may extend from the communication hole 342a toward a rear side in parallel to an axis, and is formed to be inclined at an end thereof to be communicated with a surface of the flange 345a, which faces the radial direction "R". When the rotor sleeve 330a and the reflective plate 400a are assembled, a location of an end of the flow groove 343a may correspond to a location of the fluid hole 441a of the reflective plate 400a.

In detail, the flange 345a may include an assembly surface 346a, a rear surface 348a, and a connection surface 347a.

The assembly surface 346a may be a surface that faces the rotor core 310a, and the rear surface 348a may be a surface in an opposite direction to the assembly surface 346a and may be a surface that faces the housing cover 130a.

Furthermore, the connection surface 347a may be a surface that connects the assembly surface 346a and the rear surface 348a and may be a surface that faces the radial direction "R". Here, an end of the flow groove 343a may be formed on the assembly surface 346a and the connection surface 347a to be recessed. Furthermore, an end of the flow groove 343a may be formed to be communicated with the connection surface 347a. That is, an end of the flow groove 343a may extend not toward the rear surface 348a but toward the connection surface 347a, and thus a surface of the rotor sleeve 330a, which faces the housing cover 130a, that is, the rear surface 348a of the flange 345a may be in a closed state.

Meanwhile, the reflective plate 400a may include an assembly part 420a, a connection part 440a, and a reflection part 460a.

The assembly part 420a may be interposed between a rear surface of the rotor core 310a, which faces the housing cover 130a, and the assembly surface 346a. Furthermore, the connection part 440a may extend from the assembly part 420a in the direction that faces the housing cover 130a and may be configured to contact the connection surface 347a, and the fluid hole 441a may pass therethrough to be communicated with the flow groove 343a.

Furthermore, the reflection part 460a may extend from an end of the connection part 440a in the radial direction "R". Here, the fluid spattering path may be a path, along which the cooling fluid that flows via the fluid flow path is reflected by the reflection part 460a to spatter toward a periphery of the stator 200a.

In detail, the assembly part 420a may be formed to have a shape corresponding to the assembly surface 346a to surface-contact the assembly surface 346a of the flange 345a.

Furthermore, the connection part 440a may extend from the assembly part 420a, and may be formed to have a shape corresponding to the connection surface 347a to surface-contact the connection surface 347a of the flange 345a. That is, the assembly part 420a and the connection part 440a may be configured to surround the assembly surface 346a and the connection surface 347a.

In this state, a surface of the assembly part 420a in an opposite surface to a direction that faces the assembly surface 346a; may surface-contact the rotor core 310a. That is, the assembly part 420a may be assembled while being interposed between a rear surface of the rotor core 310a and the assembly surface 346a. Accordingly, a front surface of the assembly part 420a is supported by the rotor core 310a, and a rear surface of the assembly part 420a is supported by the assembly surface 346a.

Accordingly, because the assembly part 420a and the connection part 440a are supported by the assembly surface 346a and the connection surface 347a while surface-contacting them and the assembly part 420a is assembled while being interposed between the rotor core 310a and the assembly surface 346a when the reflective plate 400a and the rotor sleeve 330a are assembled, the reflective plate 400a and the rotor assembly 300a may be stably assembled.

Accordingly, when an electric voltage is applied to the stator 200a and the rotor assembly 300a is rotated, the reflective plate 400a may be prevented from being separated from the rotor assembly 300a. Accordingly, according to the second embodiment of the present disclosure, damage to the reflective plate 400a may be minimized when the motor 10a is driven whereby a durability performance thereof may be enhanced.

Meanwhile, an end of the flow groove 343a may be formed to be inclined toward an outer side in the radial direction "R" as it goes in the direction that faces the housing cover 130a. Furthermore, the fluid hole 441a may be formed to be inclined to correspond to an inclination direction of the flow groove 343a.

In detail, the fluid hole 441a may pass through the connection part 440a, and may be formed to be inclined in the direction that faces the housing cover 130a as it goes in the radial direction "R". This is for causing the cooling fluid discharged through the fluid hole 441a to flow toward the reflection part 460a. When the fluid hole 441a is not inclined but is formed toward the radial direction "R", an amount of the cooling fluid that flows to the fluid spattering path along the reflection part 460a may become smaller, and thus the cooling fluid may not reach to the terminal 230a located at a periphery of the stator 200a. The present disclosure may increase an amount of the cooling fluid that flows along the fluid spattering path by foaming the fluid hole 441a such that the fluid hole 441a is inclined.

Furthermore, the reflection part 460a may be formed to be curved in the direction that faces the housing cover 130a.

In detail, the reflective surface of the reflection part 460a may be famed to have a curved shape, and the reflective surface may be formed to have a shape that is convex toward the housing cover 130a. Due to the shape of the reflection part 460a, a larger amount of the cooling fluid may reach the coil 210a and the terminal 230a. However, the shape of the reflection part 460a is not limited thereto, and may be variously modified in consideration of the shape of the motor interior-space and the components disposed therein.

Meanwhile, the second embodiment of the present disclosure may further include a front end plate 500a that is provided on a front surface of the rotor core 310a.

In detail, referring to FIGS. 19 and 20, the front end plate 500a, the rotor core 310a, and the reflective plate 400a may be disposed in the rotor sleeve 330a in a sequence thereof from a front side toward a rear side, in a coupled state. Furthermore, according to an assembling sequence, the reflective plate 400a may be assembled first in the rotor sleeve 330a, and the rotor core 310a and the front end plate 500a may be assembled in a sequence thereof. That is, according to the present disclosure, the reflective plate 400a may be assembled at a location of the rear end plate that is conventionally assembled on a rear surface of the rotor core 310. That is, according to the present disclosure, the reflective plate 400a may be assembled in replacement of the existing rear end plate.

Accordingly, the present disclosure may prevent the number of components from being increased as compared with the existing motor 10a, and may not add the existing process of assembling the rear end plate to assemble the reflective plate 400a by replacing the process. Accordingly, an assembling performance and a manufacturing performance of the motor 10a may be enhanced.

Furthermore, according to the present disclosure, because the reflective plate 400a is assembled at a location of the existing rear end plate, the reflective plate 400a may be firmly assembled with the rotor assembly 300a, and thus a durability performance of the motor 10a may be enhanced by preventing the reflective plate 400a from being separated or damaged.

Meanwhile, an outer diameter of the reflective plate 400a may be larger than an outer diameter of the front end plate 500a.

In detail, the reflective plate 400a may be assembled in replacement of the existing rear end plate, and the outer diameter of the reflective plate 400a may be larger than the outer diameter of the front end plate 500a, that is, the outer diameter of the existing rear end plate. Accordingly, the existing rotor core 310a of the rear end plate may be supported and the cooling fluid may spatter to the periphery of the stator 200a as well.

Third Embodiment

Hereinafter, a motor according to a third embodiment of the present disclosure will be described with reference to FIGS. 21 to 30.

Figure 21:
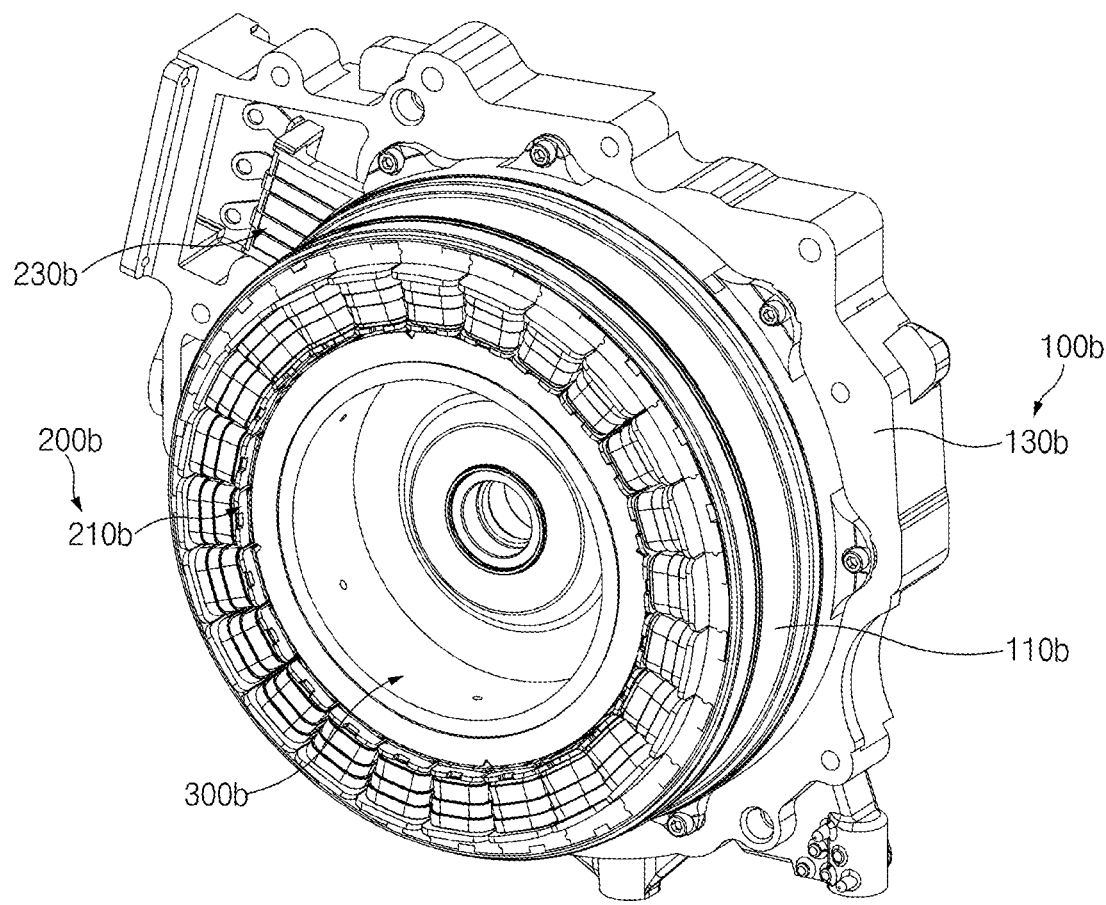
FIG. 21 is a perspective view illustrating a motor according to a third embodiment of the present disclosure.

FIG. 21 is a perspective view illustrating the motor according to the third embodiment of the present disclosure.

Figure 22:
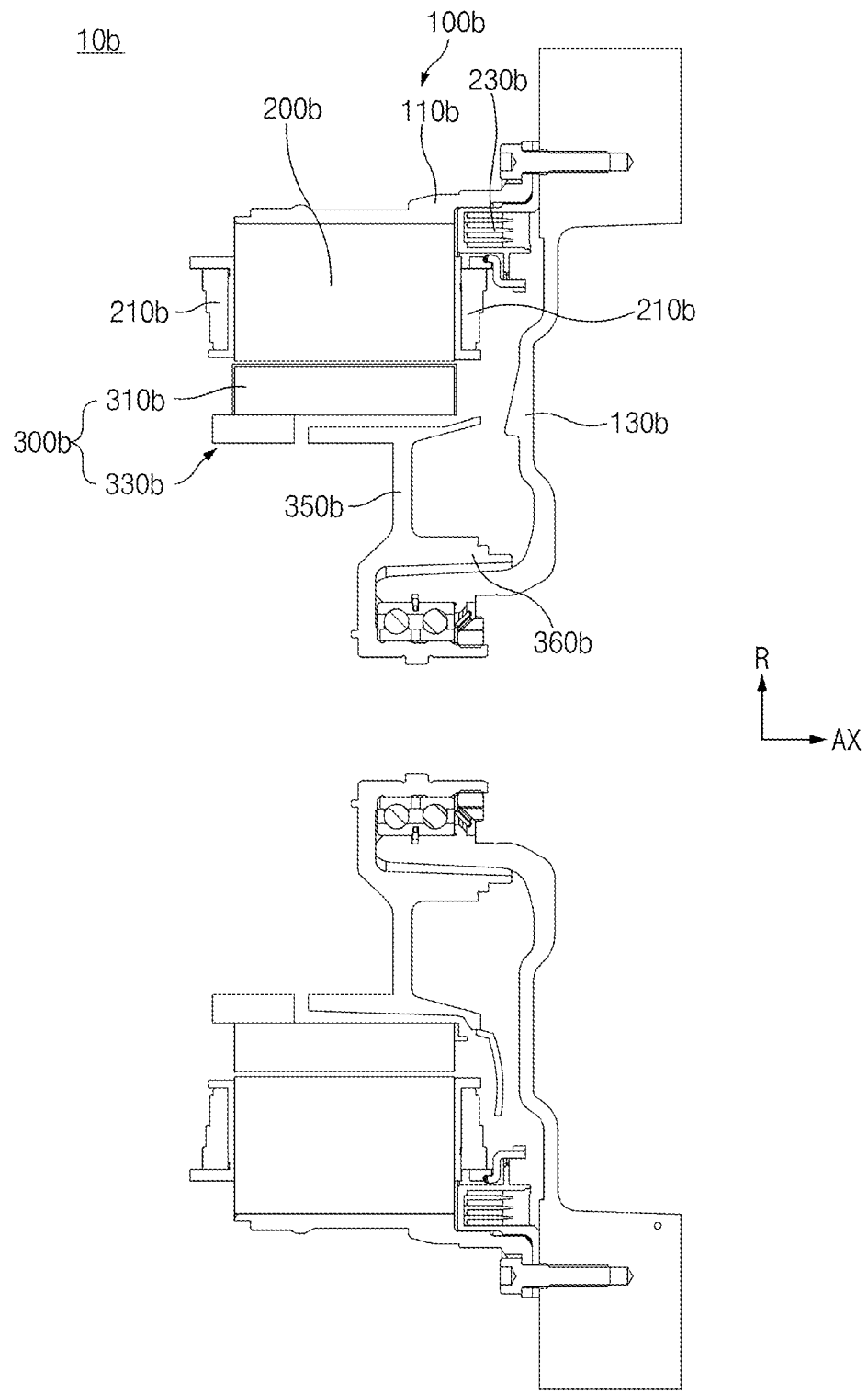
FIG. 22 is a cross-sectional view of a cross-section of a motor according to a third embodiment of the present disclosure.
Figure 23:
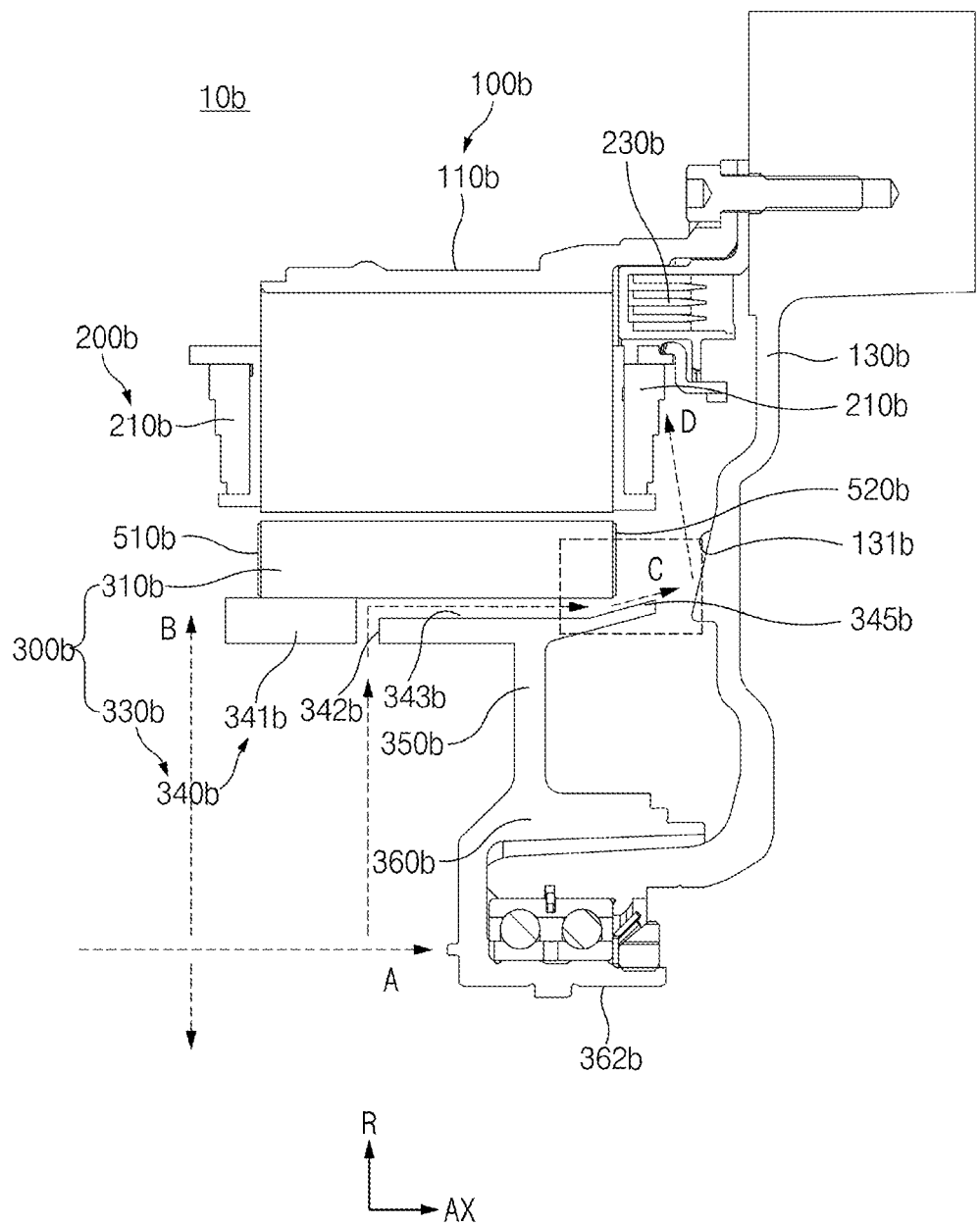
FIG. 23 is a cross-sectional view illustrating a portion of a motor according to a third embodiment of the present disclosure, and is an enlarged cross-sectional view of a portion of FIG. 22.
Figure 24:
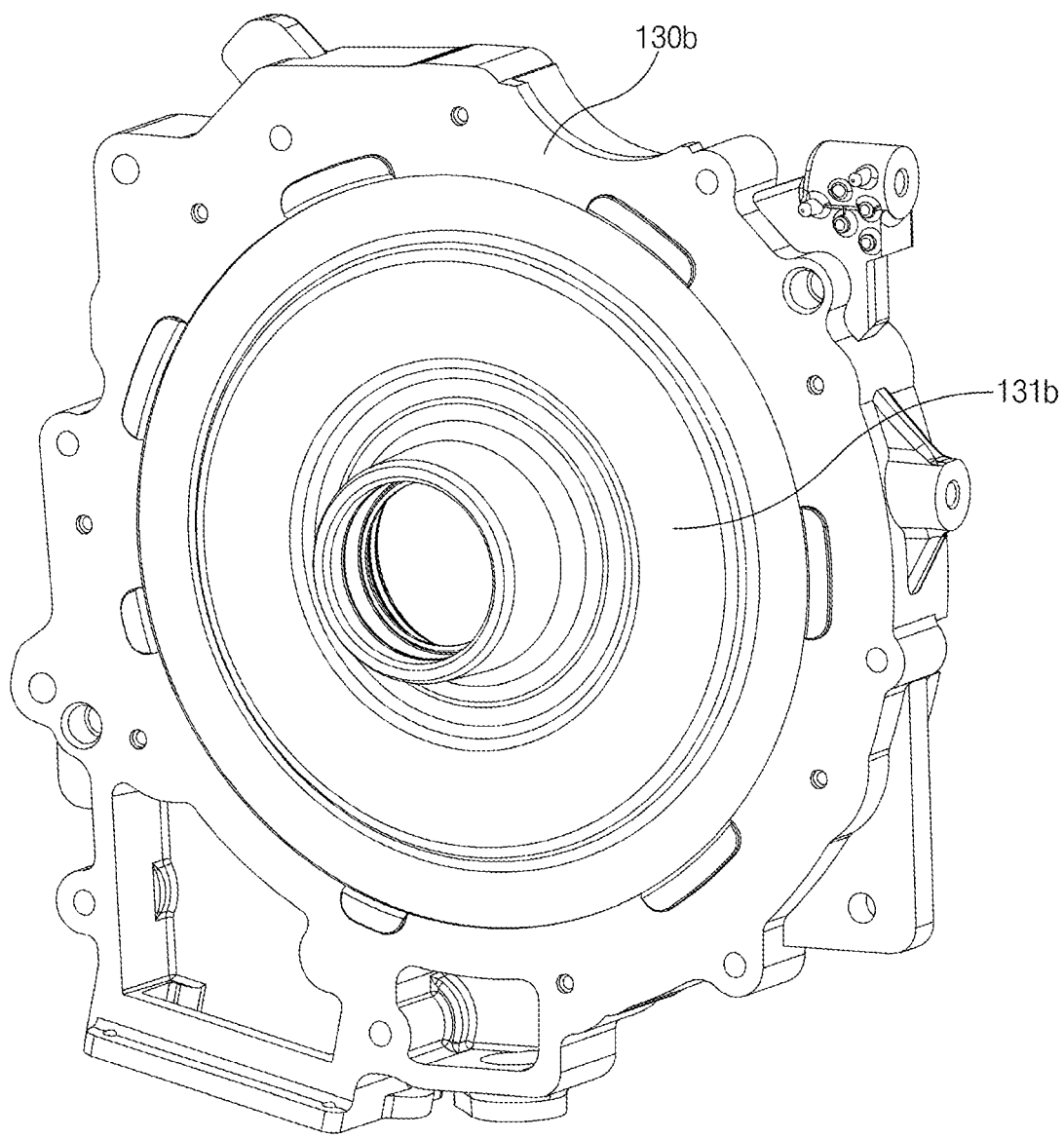
FIG. 24 is a perspective view illustrating a housing cover according to a third embodiment of the present disclosure.
Figure 25:
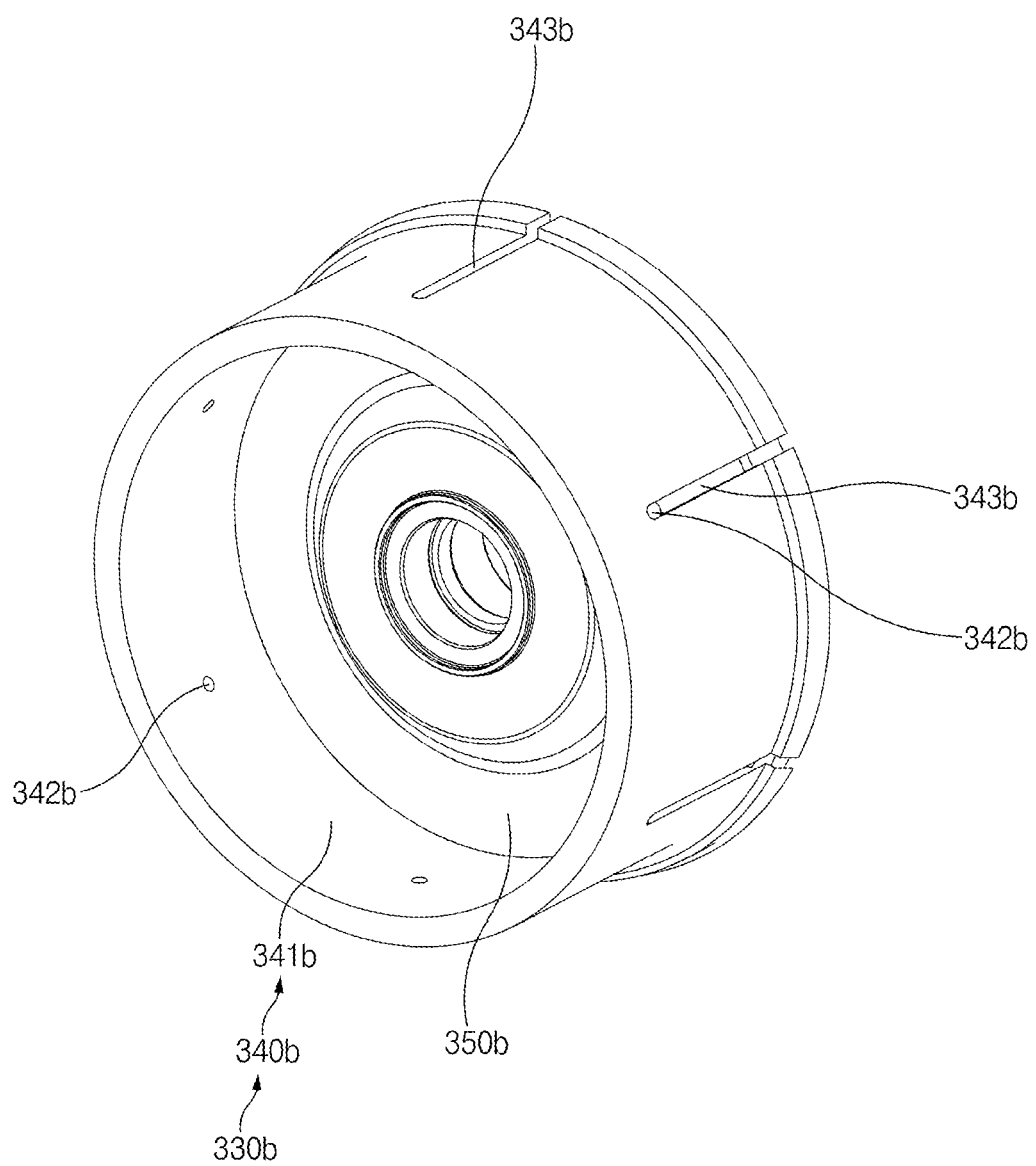
FIG. 25 is a perspective view illustrating a rotor sleeve according to a third embodiment of the present disclosure.
Figure 26:
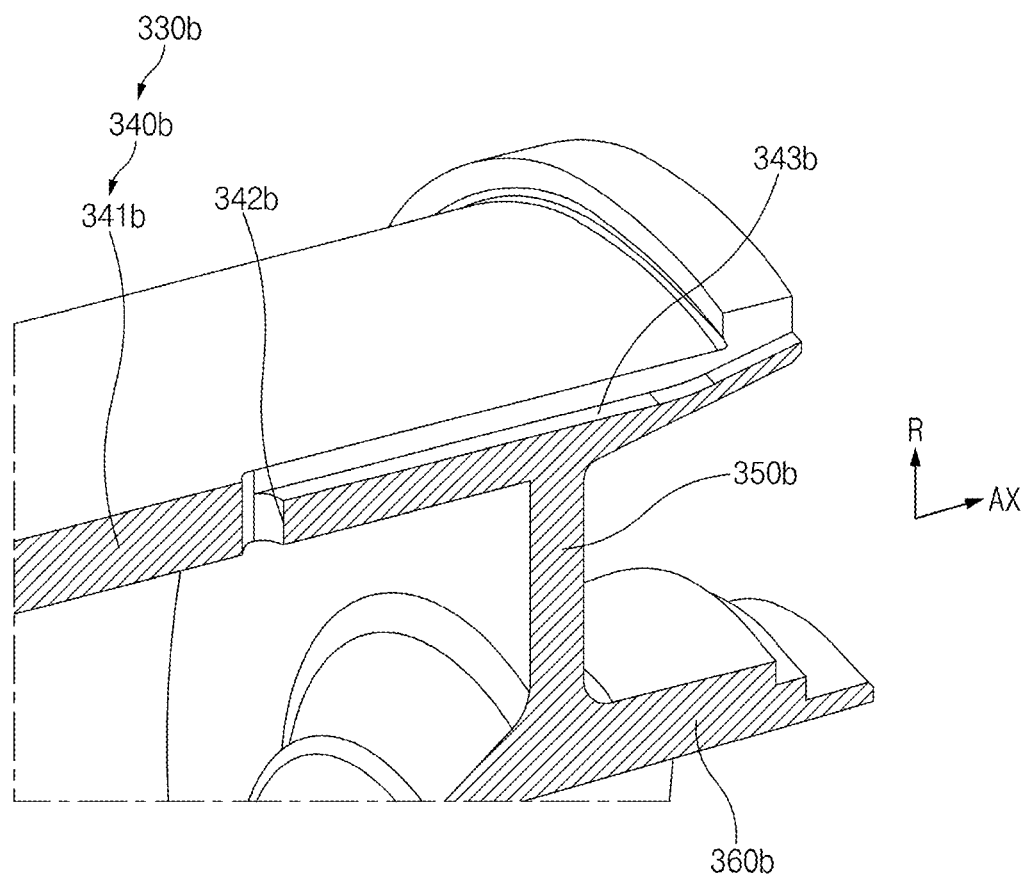
FIG. 26 is a cross-sectional perspective view illustrating a portion of a rotor sleeve according to a third embodiment of the present disclosure.
Figure 27:
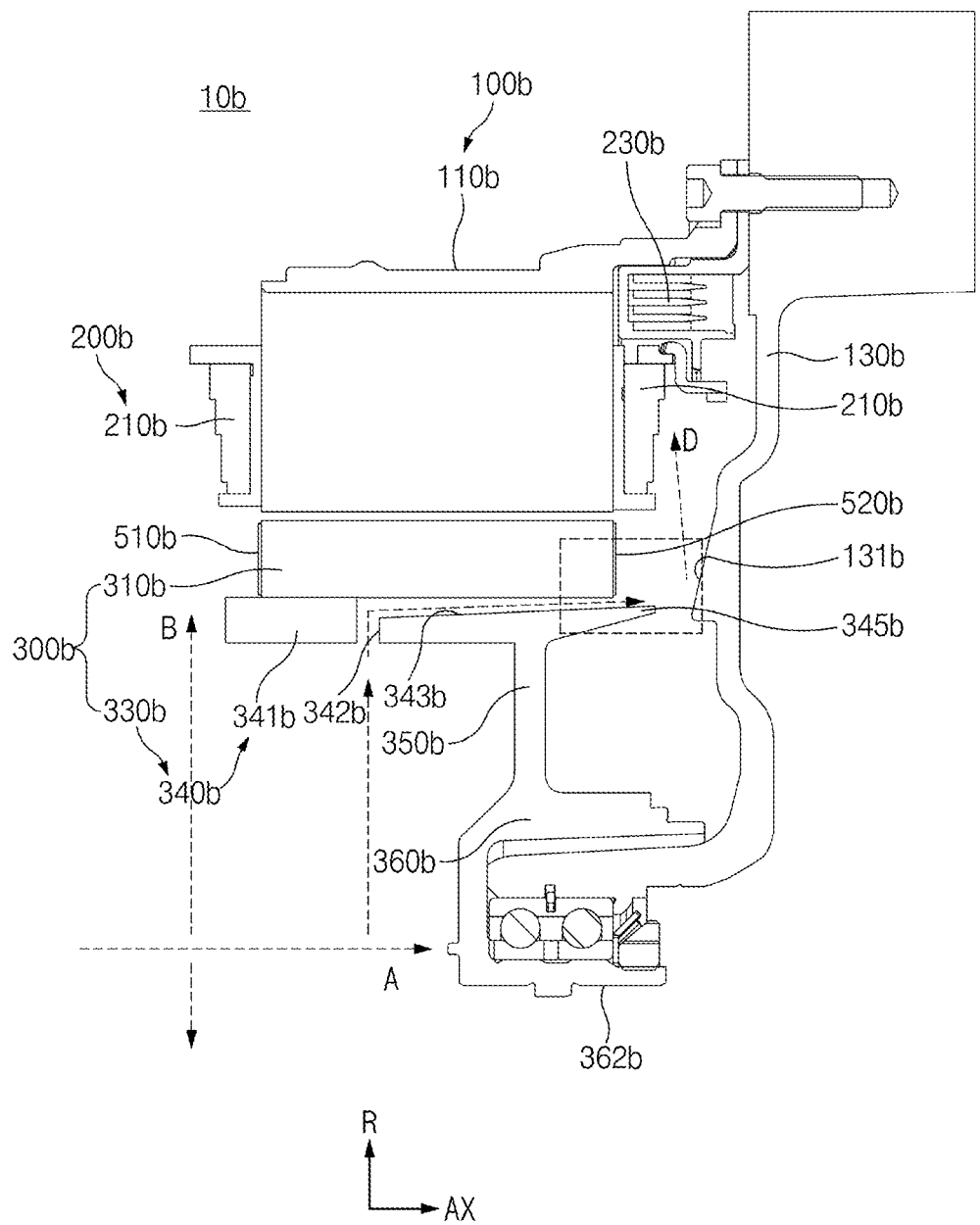
FIG. 27 is a cross-sectional view illustrating a portion of a motor according to a modified example of a third embodiment of the present disclosure.
Figure 28:
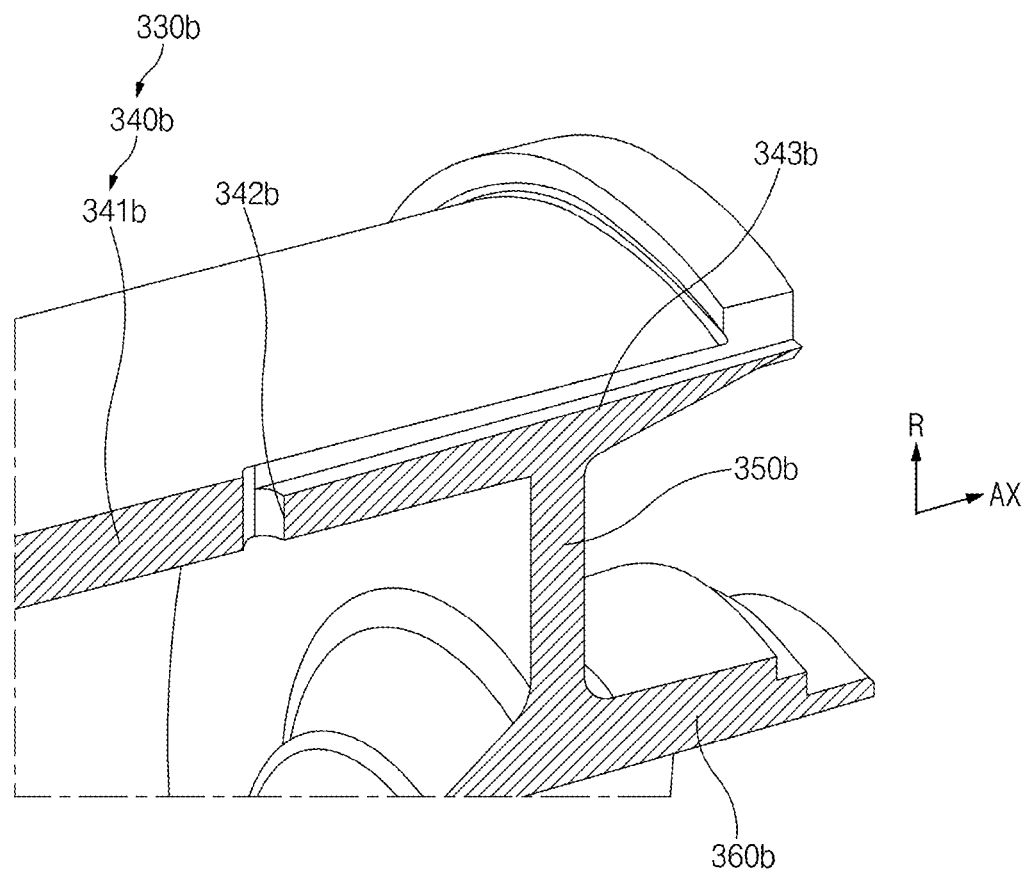
FIG. 28 is a cross-sectional perspective view illustrating a portion of a rotor sleeve illustrated in FIG. 27.
Figure 29:
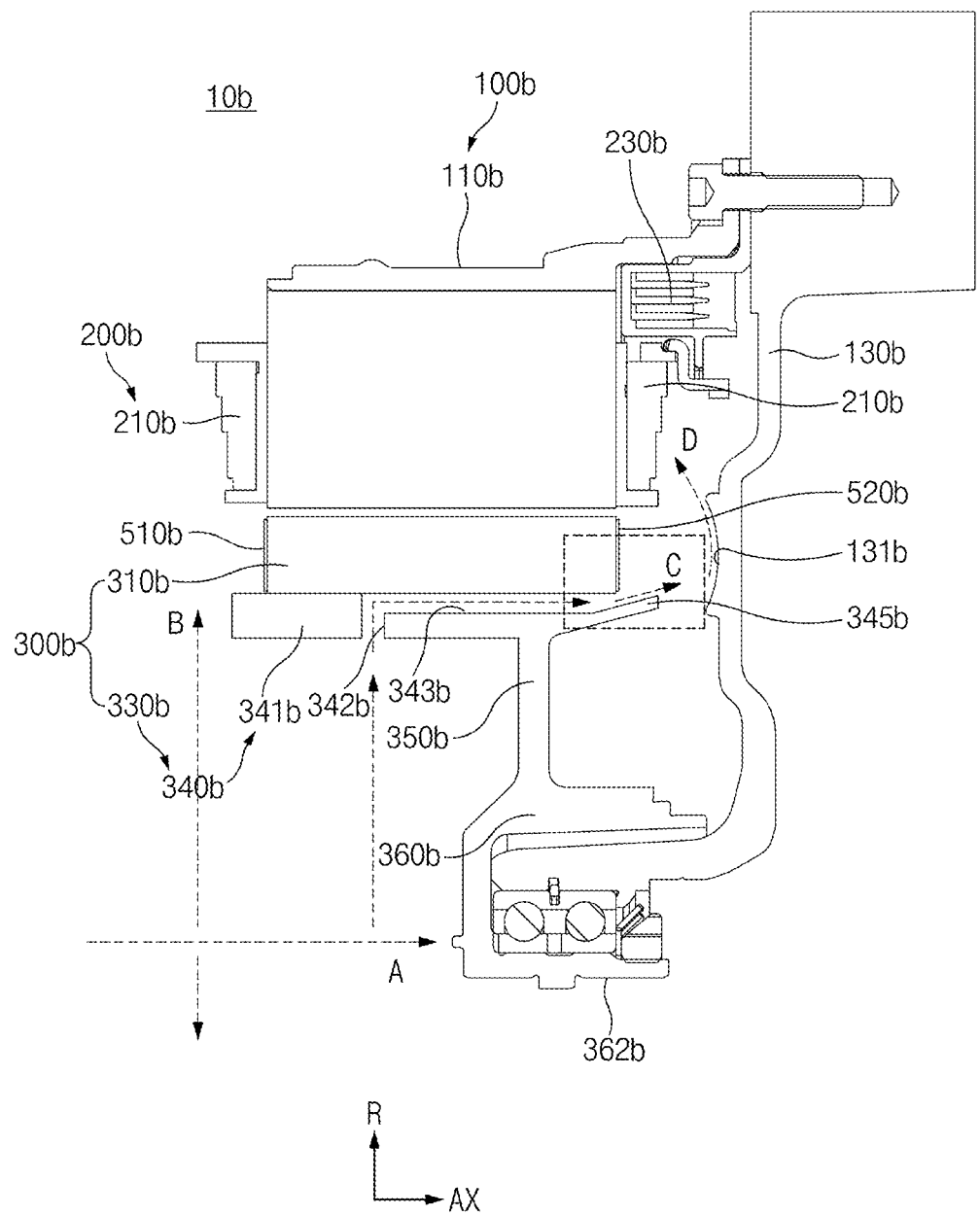
FIG. 29 is a cross-sectional view illustrating a portion of a motor according to a first modification of a third embodiment of the present disclosure.

FIG. 22 is a cross-sectional view of a cross-section of the motor according to the third embodiment of the present disclosure. FIG. 23 is a cross-sectional view illustrating a portion of the motor according to the third embodiment of the present disclosure, and is an enlarged cross-sectional view of a portion of FIG. 22. FIG. 24 is a perspective view illustrating a housing cover according to the third embodiment of the present disclosure. FIG. 25 is a perspective view illustrating a rotor sleeve according to the third embodiment of the present disclosure. FIG. 26 is a cross-sectional perspective view illustrating a portion of the rotor sleeve according to the third embodiment of the present disclosure. FIG. 27 is a cross-sectional view illustrating a portion of a motor according to a modified example of the third embodiment of the present disclosure. FIG. 28 is a cross-sectional perspective view illustrating a portion of the rotor sleeve illustrated in FIG. 27. FIG. 29 is a cross-sectional view illustrating a portion of a motor according to a first modification of the third embodiment of the present disclosure. FIG. 30 is a cross-sectional view illustrating a portion of a motor according to a second modification of the third embodiment of the present disclosure.

Referring to FIGS. 21 to 26, a motor 10b according to the third embodiment of the present disclosure includes a housing part 100b, a stator 200b, and a rotor assembly 300b.

The housing part 100b includes a housing body 110b, and a housing cover 130b that is configured to cover one side of the housing body 110b.

The housing body 110b may have a hollow ring shape or a cylindrical shape, and may be coupled and adhered to an outer peripheral surface of the stator 200b to surround it. The housing body 110b may be formed such that opposite ends thereof in an axial direction AX are opened. Here, the axial direction AX of the housing body 110b may coincide with an axial direction AX of the stator 200b and an axial direction AX of the rotor assembly 300b. Hereinafter, their general term will be referred to the axial direction AX.

The housing cover 130b may be coupled to the housing body 110b to cover the one side of the housing body 110b in the axial direction AX. The housing cover 130b has a through-hole such that an output shaft passes therethough.

The stator 200b is provided in an interior of the housing body 110b. For example, the stator 200b may be installed while being fixed in the interior of the housing body 110b. The stator 200b may include a coil 210b installed in a bobbin, and a terminal 230b that is electrically connected to the coil 210b. The coil 210b may be magnetized when an electric voltage is applied to the terminal 230b from an external power source. Hereinafter, an end of the coil 210b, which faces the housing cover 130b, will be referred to as one-side coil end and an end of the coil 210b, in an opposite direction to a direction that faces the housing cover 130b, will be referred to as an opposite-side coil end. In this case, the one-side coil end may be covered by the housing cover 130b.

The rotor assembly 300b is accommodated inside the stator 200b to be rotatable, and has a fluid flow path for causing a cooling fluid introduced to a front side thereof to flow into a rear side that faces the housing cover 130b.

In detail, the bobbin, on which the coil 210b is wound, may be installed to surround the rotor assembly 300b, and the rotor assembly 300b may be rotated when electric power is supplied to the coil 210b. Through the rotation of the rotor assembly 300b, the motor 10b outputs a torque as the output shaft connected to a shaft hole 362b of the rotor assembly 300b is rotated. Hereinafter, a rearward direction of the motor 10b or the rotor assembly 300b is defined as a direction that faces the housing cover 130b from the rotor assembly 300b, and a forward direction of the motor 10b or the rotor assembly 300b is defined as an opposite direction to a direction that faces the housing cover 130b from the rotor assembly 300b.

Furthermore, a space between rear surfaces of the rotor assembly 300b and the stator 200b, and the housing cover 130b is defined as a motor interior-space. As in the illustrated embodiment, the one-side coil end and the terminal 230b may be located in the motor interior-space.

The rotor assembly 300b may include a rotor core 310b and the rotor sleeve 330b.

A through-hole may be formed in an interior of the rotor core 310b may in the axial direction AX. The rotor core 310b may be configured to be rotated because an inductive current is generated when a current is applied to the coil 210b of the stator 200b. A first end plate 510b and a second end plate 520b may be provided on opposite ends of the rotor core 310b.

The rotor sleeve 330b may pass through the through-hole to be coupled to the rotor core 310b, and the shaft hole 362b that extends in the axial direction AX and a front space part that is opened in an opposite direction to the direction that faces the housing cover 130b may be formed in the rotor sleeve 330b. In detail, the rotor sleeve 330b is an element that is adhered to an inner peripheral surface of the rotor core 310b and is rotated together with the rotor core 310b, and is an element, an output shaft of which is connected to the shaft hole 362b such that a rotational force of the rotor core 310b is transmitted to the output shaft. The front space part may be formed on a front surface of the rotor sleeve 330b, and a rear surface of the rotor sleeve 330b may be coupled to the housing cover 130b to be rotatable.

Here, the fluid flow path may be implemented by the rotor sleeve 330b, may be implemented by the rotor sleeve 330b and the rotor core 310b, and may be configured to be communicated with the front space part and the motor interior-space. That is, the cooling fluid that flows through the front space part may flow in the direction that faces the housing cover 130b through the fluid flow path.

For example, referring to FIGS. 21 to 23, the cooling fluid may be supplied through a cooling channel (not illustrated) provided in the stator 200b or the housing body 110b, and may be supplied to the front space part of the rotor sleeve 330b by a pump (not illustrated) (see flow "A" of FIG. 23). The cooling fluid supplied to the front space part of the rotor sleeve 330b may be spatter to a radial direction "R" of the rotor assembly 300b when the rotor assembly 300b is rotated to cool the rotor core 310a on an outer side of the rotor sleeve 330b and the coil 210b of the stator 200b (see flow "B" of FIG. 23).

Furthermore, the fluid flow path is formed in the rotor sleeve 330b according to an embodiment of the present disclosure, and thus the cooling fluid supplied to the front space part may flow in the direction that faces the housing cover 130b, that is, to the motor interior-space. In detail, the cooling fluid that spatters toward an inner surface of the rotor sleeve 330b in the front space part due to a centrifugal force when the rotor assembly 300b is rotated may be guided by the fluid flow path formed in the rotor sleeve 330b and may flow to the motor interior-space (see flow "C" of FIG. 23).

Meanwhile, the housing cover 130a may include a reflective plate part 131b. The reflective plate part 131b is formed to protrude in a direction that faces the rotor assembly 300b and face the fluid flow path, and is configured to define a fluid spattering path, along which the cooling fluid that flows through the fluid flow path spatters in the radial direction.

In detail, when the cooling fluid reaches the motor interior-space through the fluid flow path, the reached cooling fluid may be reflected by the reflective plate part 131b and may spatter in the radial direction (see flow "D" of FIG. 23). Then, the cooling fluid also may flow in the radial direction "R" by the centrifugal force due to the rotation of the rotor assembly 300b, but the reflective plate part 131b may function to define the fluid spattering path such that the spattering cooling fluid spatters toward the terminal 230b or the one-side coil end. That is, the fluid spattering path may be a path for guiding the cooling fluid that flows into the interior space of the motor toward a periphery of the stator 200b, that is, in a direction that faces the coil 210b and the terminal 230b.

In this way, the present disclosure may effectively cool components located in the motor interior-space because the cooling fluid may reach an area, which is difficult for the cooling fluid to reach, that is, the motor interior-space in an existing structure due to the fluid flow path formed in the rotor sleeve 330b and the fluid spattering path defined by the reflective plate part 131b.

Accordingly, the present disclosure may prevent the terminal 230b and the coil 210b located in the motor interior-space from being insulation-destructed due to overheating because the cooling fluid may be delivered to the terminal 230b and the coil 210b without using an additional separate device.

Meanwhile, referring to FIGS. 23 and 24, the reflective plate part 131b may be formed to extend in the radial direction, and may have a ring shape on a surface of the housing cover 130b, which faces the rotor assembly 300b.

Here, the description that the reflective plate part 131b extends in the radial direction "R" does not mean only a case, in which the reflective plate part 131b extends in parallel to the radial direction "R", but also has to be construed that it also includes a case, in which the reflective plate 400b extends in the radial direction "R" as a whole while having a specific angle with respect to the radial direction "R" as illustrated in FIG. 23 and the like.

In detail, the reflective plate part 131b may be continuously formed along a circumference of a central axis of the housing cover 130b. However, the present disclosure is not limited thereto, and the reflective plate part 131b may be intermittently formed while including an area that faces the fluid flow path. Furthermore, an outer end of the reflective plate part 131b in the radial direction "R" may extend to face a periphery of the stator 200b, and thus the cooling fluid may be guided to spatter toward the coil 210b, the terminal 230b, and the like.

Meanwhile, referring to FIGS. 22 to 24, the reflective plate part 131b according to the third embodiment of the present disclosure may be formed to be inclined in a direction that becomes farther away from the rotor assembly 300b as it goes from the central axis of the housing cover 130b toward an outside in the radial direction.

In detail, a radially inner area of the reflective plate part 131b may be adjacent to the rotor assembly 300b, and the reflective plate part 131b may be formed to be inclined so as to become farther away from the rotor assembly 300b as it goes to an outer side in the radial direction. Accordingly, the cooling fluid that flows to the motor interior-space through the fluid flow path may spatter to the outside in the radial direction while being restrained from flowing to the inner side in the radial direction. That is, when the reflective plate part 131b is famed to be inclined, the path, along which the cooling fluid spatters to the coil 210b and the terminal 230b, may be formed more smoothly.

Meanwhile, the rotor sleeve 330b may include a boss part 360b, a radius part 350b, and a sleeve body part 340b.

The shaft hole 362b may be formed in the boss part 360b, and may be coupled to the housing cover 130b to be rotatable. For example, a bearing may be installed between the boss part 360b and the housing cover 130b, and the boss part 360a may be configured to be rotated with respect to the housing part 100b.

The radius part 350b may extend from the boss part 360b in the radial direction "R". The rotor sleeve 330b may be divided into a front area and a rear area by the radius part 350b.

The sleeve body part 340b may extend from an end of the radius part 350b and may have a cylindrical shape, and the rotor core 310b may be assembled on an outer peripheral surface of the sleeve body part 340b. In detail, an inner surface of the sleeve body part 340b may be integrally formed with the radius part 350b, and an outer peripheral surface of the sleeve body part 340b may be adhered to an inner peripheral surface of the rotor core 310b. Here, the front space part may be surrounded by an inner surface of the sleeve body part 340b, a front surface of the radius part 350b, and a front surface of the boss part 360b.

In more detail, the sleeve body part 340b may include a body 341b, a communication hole 342b that passes through the body 341b to be communicated with the front space part, and a flow groove 343b formed concavely on an outer surface of the body 341b to be communicated with the communication hole 342b and formed to extend from the communication hole 342b in the direction that faces the housing cover 130b. Furthermore, the fluid flow path may be implemented by the communication hole 342b and the flow groove 343b.

For example, the flow groove 343b may be recessed on an outer surface of the sleeve body part 340b, and may extend in a direction that is parallel to the axial direction AX. A front end of the flow groove 343b may be connected to the communication hole 342b, and a rear end of the flow groove 343b may extend to an end of the sleeve body part 340b. When the rotor assembly 300b is rotated, the cooling fluid may pass through the rotor sleeve 330b through the communication hole 342b and may flow to an outside of the rotor sleeve 330b. Furthermore, the cooling fluid may flow to a rear side that faces the housing cover 130b through the flow groove 343b. The cooling fluid that flows in the direction that faces the housing cover 130a may be ejected from an end of the flow groove 343b, and may be reflected by the reflective plate part 131b to spatter toward a periphery of the stator 200b.

Furthermore, a plurality of flow grooves 343b and a plurality of communication holes 342b may be provided. Furthermore, the plurality of flow grooves 343b and the plurality of communication holes 342b may be disposed to be spaced apart from each other along a circumferential direction of the sleeve body part 340b. Accordingly, the plurality of flow grooves 343b may be formed in parallel to each other. However, the number, the intervals, and the shapes of the flow grooves 343b are not limited to the above-described ones, and may be modified into various shapes as long as the cooling fluid discharged through the communication hole 342b may flow to the motor interior-space.

Meanwhile, according to the third embodiment of the present disclosure, an end of the flow groove 343b in the direction that faces the housing cover 130b may be foiled to be inclined to face an outer side in the radial direction "R" as it goes in the direction that faces the housing cover 130b (see FIGS. 22, 23, and 27).

In detail, a rear end of the flow groove 343b may be formed to be deflected toward an outer side in the radial direction "R". Accordingly, the cooling fluid that flows through the fluid flow path may be ejected in a direction that becomes farther away from a central axis. However, the shape of the flow groove 343b is not limited thereto.

Meanwhile, hereinafter, a motor 10b according to a modified example of the third embodiment of the present disclosure will be described with reference to FIGS. 27 and 28. FIG. 27 is a cross-sectional view illustrating a portion of the motor according to the modified example of the third embodiment of the present disclosure. FIG. 28 is a cross-sectional perspective view illustrating a portion of a rotor sleeve according to the modified example of the third embodiment of the present disclosure.

The motor 10b according to the modified example of the third embodiment of the present disclosure is different from that of the third embodiment in the shape of the flow groove 343b of the rotor sleeve 330b. Accordingly, all the configurations of the third embodiment, except for the above-described differences, may be included. Hereinafter, a repeated description of the same configurations as the above-described ones will be omitted.

According to the modified example of the third embodiment of the present disclosure, an end of the flow groove 343b in the direction that faces the housing cover 130b may include a section that extends in parallel to an axial direction that faces the housing cover 130b.

In detail, a rear end of the flow groove 343b may not be deflected but may have a straight shape to be parallel to the axial direction AX. Accordingly, it may be easy to manufacture the flow groove 343b. Even when the flow groove 343b extends in parallel to the axial direction, the cooling fluid that deviates from the flow groove 343b may spatter to an outer side in the radial direction "R" due to the rotation of the rotor assembly 300b. Furthermore, because the cooling fluid is guided by a reflection part 430b and flows to the fluid spattering path, it may spatter to the periphery of the stator 200b even when the end of the flow groove 343b is formed straight.

Meanwhile, hereinafter, a motor 10b according to a first modification of the third embodiment of the present disclosure will be described with reference to FIG. 29. FIG. 29 is a cross-sectional view illustrating a portion of the motor 10b according to the first modification of the third embodiment of the present disclosure.

The motor 10b according to the first modification of the third embodiment of the present disclosure is different from that of the third embodiment in the shape of the reflective plate part 131b. Accordingly, the first modification of the third embodiment of the present disclosure may include all the configurations of the third embodiment, except for the above-described differences. Hereinafter, a repeated description of the same configurations as the above-described ones will be omitted.

According to the first modification of the third embodiment of the present disclosure, the reflective plate part 131b may have a curved shape that is curved in an opposite direction to the direction that faces the rotor assembly 300b.

In detail, the reflective plate part 131b may be formed to be concave in a direction that becomes farther away from the rotor assembly 300b. Accordingly, a radially inner area of the reflective plate part 131b may be formed to be adjacent to the rotor assembly 300b, and may restrain the cooling fluid from flowing to the radially inner side. Furthermore, a radially outer end of the reflective plate part 131b may extend in a direction that faces the coil 210b or the terminal 230b. Due to the curved shape and the extension direction of the end of the reflective plate part 131b, a large amount of the cooling fluid may reach the coil 210b and the terminal 230b through the fluid flow path. However, the shape of the reflective plate part 131b is not limited to the embodiments, and may be variously modified in consideration of the shape of the interior space of the motor and the components disposed therein.

Meanwhile, hereinafter, a motor 10b according to a second modification of the third embodiment of the present disclosure will be described with reference to FIG. 30. FIG. 30 is a cross-sectional view illustrating a portion of the motor 10b according to the second modification of the third embodiment of the present disclosure.

The motor 10b according to the second modification of the third embodiment of the present disclosure is different from that of the second embodiment in the shape of the flow groove 343b of the rotor sleeve 330b. Accordingly, all the configurations of the second embodiment, except for the above-described differences, may be included. Hereinafter, a repeated description of the same configurations as the above-described ones will be omitted.

According to the second modification of the third embodiment of the present disclosure, an end of the flow groove 343b in the direction that faces the housing cover 130b may include a section that extends in parallel to an axial direction that faces the housing cover 130b.

In detail, a rear end of the flow groove 343b may not be deflected but may have a straight shape to be parallel to the axial direction AX. Accordingly, it may be easy to manufacture the flow groove 343b. Even when the flow groove 343b extends in parallel to the axial direction, the cooling fluid that deviates from the flow groove 343b may spatter to an outer side in the radial direction "R" due to the rotation of the rotor assembly 300b. Furthermore, because the cooling fluid is guided by the reflection part 430b and flows to the fluid spattering path, it may spatter to the periphery of the stator 200b even when the flow groove 343b is formed straight.

The motor according to the embodiments of the present disclosure may effectively cool components located in the motor interior-space because the cooling fluid may reach an area, which is difficult for the cooling fluid to reach, that is, the motor interior-space in an existing structure and may prevent the terminal and the coil located in the motor interior-space from being insulation-destructed due to overheating.

In this way, the motor according to the embodiment of the present disclosure may effectively cool components located in the motor interior-space because the cooling fluid may reach an area, which is difficult for the cooling fluid to reach, that is, the motor interior-space in an existing structure due to the fluid flow path formed in the rotor sleeve and the fluid spattering path defined by the reflective plate.

Furthermore, according to the embodiment of the present disclosure, the terminal and the coil located in the motor interior-space may be prevented from being insulation-destructed due to overheating because the cooling fluid may be delivered to the terminal and the coil without using an additional separate device.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A motor comprising:
   a housing part including a housing body, and a housing cover configured to cover one side of the housing body;
   a stator disposed in an interior of the housing body;
   a rotor assembly accommodated inside the stator to be rotatable, and having a fluid flow path for causing a cooling fluid introduced to a front side thereof to flow into a rear side that faces the housing cover; and
   a reflective plate coupled to the rotor assembly, disposed between the rotor assembly and the housing cover, and configured to define a fluid spattering path, along which the cooling fluid that flows through the fluid flow path spatters in a radial direction of the rotor assembly.

2. The motor of claim 1, wherein the rotor assembly further includes:
   a rotor core having a through-hole disposed in an interior of the rotor core in an axial direction of the rotor assembly; and
   a rotor sleeve coupled to the rotor core to pass through the through-hole, and having a shaft hole that passes therethrough in the axial direction and a front space part that is opened in a direction opposite to a direction that faces the housing cover.

3. The motor of claim 2, wherein when a space between rear surfaces of the stator and the rotor assembly, and the housing cover is regarded as a motor interior-space, and wherein the fluid flow path is implemented by the rotor sleeve and the rotor core, and is configured to communicate the front space part and the motor interior-space.

4. The motor of claim 2, wherein the reflective plate is coupled to the rotor sleeve, extends in the radial direction, and has a ring shape.

5. The motor of claim 2, wherein the rotor sleeve further includes:
   a boss part having the shaft hole, and coupled to the housing cover to be rotatable;
   a radius part extending from the boss part in the radial direction; and
   a sleeve body part extending from an end of the radius part, having a cylindrical shape, and the rotor core is assembled on an outer peripheral surface of the sleeve body part.

6. The motor of claim 5, wherein the sleeve body part includes:
   a body;
   a communication hole passing through the body to be communicated with the front space part; and
   a flow groove disposed concavely on an outer surface of the body to be communicated with the communication hole, and extends from the communication hole in the direction that faces the housing cover, and
   wherein the fluid flow path is implemented by the communication hole and the flow groove.

7. The motor of claim 6, wherein the sleeve body part includes a plurality of flow grooves and a plurality of communication holes, and
   wherein the plurality of flow grooves and the plurality of communication holes are spaced apart from each other along a circumferential direction of the sleeve body part.

8. The motor of claim 7, wherein an end of at least one of the plurality of flow grooves, in the direction that faces the housing cover, is arranged to be inclined toward an outer side in the radial direction as the at least one of the plurality of flow grooves extends in the direction that faces the housing cover.

9. The motor of claim 7, wherein an end of at least one of the plurality of flow grooves, in the direction that faces the housing cover, extends straight in the direction that faces the housing cover.

10. The motor of claim 5, further comprising a spattering hole passing through the radius part,
    wherein the fluid flow path is implemented by the spattering hole.

11. The motor of claim 10, wherein the spattering hole is disposed to be inclined to face an outer side in the radial direction as the spattering hole extends in the direction that faces the housing cover.

12. The motor of claim 5, wherein the reflective plate includes:
    a coupling part coupled to the boss part;
    an extension part extending from the coupling part; and
    a reflection part extending from an end of the extension part in the radial direction, and configured to face the fluid flow path.

13. The motor of claim 12, wherein the boss part further includes a coupling recess disposed concavely such that an end of the coupling part is inserted thereinto and coupled thereto.

14. The motor of claim 12, wherein the reflection part is curved in the direction that faces the housing cover.

15. The motor of claim 12, wherein the reflection part is disposed to be closer to the housing cover than to the coupling part with respect to the axial direction, and
   wherein the extension part is disposed to be inclined to face an outer side in the radial direction as the extension part extends from the coupling part in a direction that faces the reflection part.

\* \* \* \* \*

UNITED STATES PATENT AND TRADEMARK OFFICE
CERTIFICATE OF CORRECTION

| | |
|---|---|
| PATENT NO. | : 12,294,274 B2 |
| APPLICATION NO. | : 17/940583 |
| DATED | : May 6, 2025 |
| INVENTOR(S) | : Yeong Woo Seo |

Page 1 of 1

It is certified that error appears in the above-identified patent and that said Letters Patent is hereby corrected as shown below:

On the Title Page

Under Colum 1, item (73):
Delete "HYUNDAI MOTOR COMPANY, Seoul (KR); KIA CORPORATION, Seoul (KR)" and insert -- HYUNDAI MOBIS CO., LTD., Seoul (KR) --

Signed and Sealed this
Twenty-ninth Day of July, 2025

Coke Morgan Stewart
*Acting Director of the United States Patent and Trademark Office*